US011256617B2

(12) United States Patent
Chen et al.

(10) Patent No.: US 11,256,617 B2
(45) Date of Patent: Feb. 22, 2022

(54) METADATA AWARE COPYBACK FOR MEMORY DEVICES

(71) Applicant: Micron Technology, Inc., Boise, ID (US)

(72) Inventors: Zhengang Chen, San Jose, CA (US); Jianmin Huang, San Carlos, CA (US)

(73) Assignee: Micron Technology, Inc., Boise, ID (US)

( * ) Notice: Subject to any disclaimer, the term of this patent is extended or adjusted under 35 U.S.C. 154(b) by 135 days.

(21) Appl. No.: 16/837,384

(22) Filed: Apr. 1, 2020

(65) Prior Publication Data

US 2021/0311869 A1 Oct. 7, 2021

(51) Int. Cl.
| G06F 12/02 | (2006.01) |
| G06F 12/0804 | (2016.01) |
| G06F 12/0817 | (2016.01) |
| G06F 9/30 | (2018.01) |
| G06F 11/10 | (2006.01) |
| G06F 12/14 | (2006.01) |

(52) U.S. Cl.
CPC ...... *G06F 12/0246* (2013.01); *G06F 9/30029* (2013.01); *G06F 11/1032* (2013.01); *G06F 12/0804* (2013.01); *G06F 12/0822* (2013.01); *G06F 12/1466* (2013.01); *G06F 2212/7207* (2013.01)

(58) Field of Classification Search
CPC .............. G06F 12/0246; G06F 12/0822; G06F 11/1032; G06F 12/0804; G06F 9/30029; G06F 12/1466; G06F 2212/7207
USPC ........................................................ 711/154
See application file for complete search history.

(56) References Cited

U.S. PATENT DOCUMENTS

| 8,661,364 | B2 | 2/2014 | Crystal | |
| 9,841,911 | B2 | 12/2017 | Yu et al. | |
| 2005/0283512 | A1* | 12/2005 | Okamoto | G11B 20/1833 |
| | | | | 708/402 |
| 2009/0187771 | A1* | 7/2009 | McLellan, Jr. | H04L 9/0891 |
| | | | | 713/193 |
| 2009/0204824 | A1 | 8/2009 | Lin et al. | |

(Continued)

FOREIGN PATENT DOCUMENTS

| CN | 101807163 A | * | 8/2010 |
| KR | 20160096435 A | | 8/2016 |

OTHER PUBLICATIONS

"International Application Serial No. PCT/US2021/024338, International Search Report dated Jul. 16, 2021", 3 pgs.

(Continued)

*Primary Examiner* — Mardochee Chery
(74) *Attorney, Agent, or Firm* — Schwegman Lundberg & Woessner, P.A.

(57) ABSTRACT

Disclosed in some examples are methods, systems, devices, and machine-readable mediums that provide for techniques for scrambling and/or updating meta-data that enable an efficient internal copyback operation. In some examples, in order to update the meta-data, the meta-data and host-data are separated and the only the meta-data is sent to the controller to be updated during a modified internal copyback operation. The host-data is not transmitted to the controller. While sending the meta-data utilizes resources of the communication link between the memory dies and the controller, it uses much fewer resources than if the host-data were also transmitted.

20 Claims, 13 Drawing Sheets

(56) References Cited

U.S. PATENT DOCUMENTS

| | | |
|---|---|---|
| 2010/0217921 A1 | 8/2010 | Mun |
| 2010/0281342 A1 | 11/2010 | Chang et al. |
| 2013/0055047 A1* | 2/2013 | Sharon ................ G06F 11/1068 |
| | | 714/764 |
| 2014/0115234 A1 | 4/2014 | Woo et al. |
| 2015/0199282 A1 | 7/2015 | Yen et al. |
| 2017/0329667 A1 | 11/2017 | Hirano et al. |
| 2019/0190712 A1 | 6/2019 | Cheng et al. |
| 2019/0393901 A1 | 12/2019 | Fainzilber et al. |
| 2021/0058237 A1* | 2/2021 | Sandberg .............. G06F 21/602 |
| 2021/0074596 A1 | 3/2021 | Kim et al. |
| 2021/0117570 A1 | 4/2021 | Bayon et al. |

OTHER PUBLICATIONS

"International Application Serial No. PCT/US2021/024338, Written Opinion dated Jul. 16, 2021", 4 pgs.
U.S. Appl. No. 16/837,315, filed Apr. 1, 2020, Self-Seeded Randomizer for Data Randomization in Flash Memory.

* cited by examiner

METADATA AWARE COPYBACK FOR MEMORY DEVICES

FIELD OF INVENTION

Embodiments pertain to memory devices. Some embodiments relate to enabling efficient internal copyback operations for copying data between two different locations within a same memory die in a memory device while also maintaining data randomization and updating meta-data of data subject to copyback operations.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others.

Flash memory is utilized as non-volatile memory for a wide range of electronic applications. Flash memory devices typically include one or more groups of transistors such as floating gate or charge trap memory cells that allow for high memory densities, high reliability, and low power consumption.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
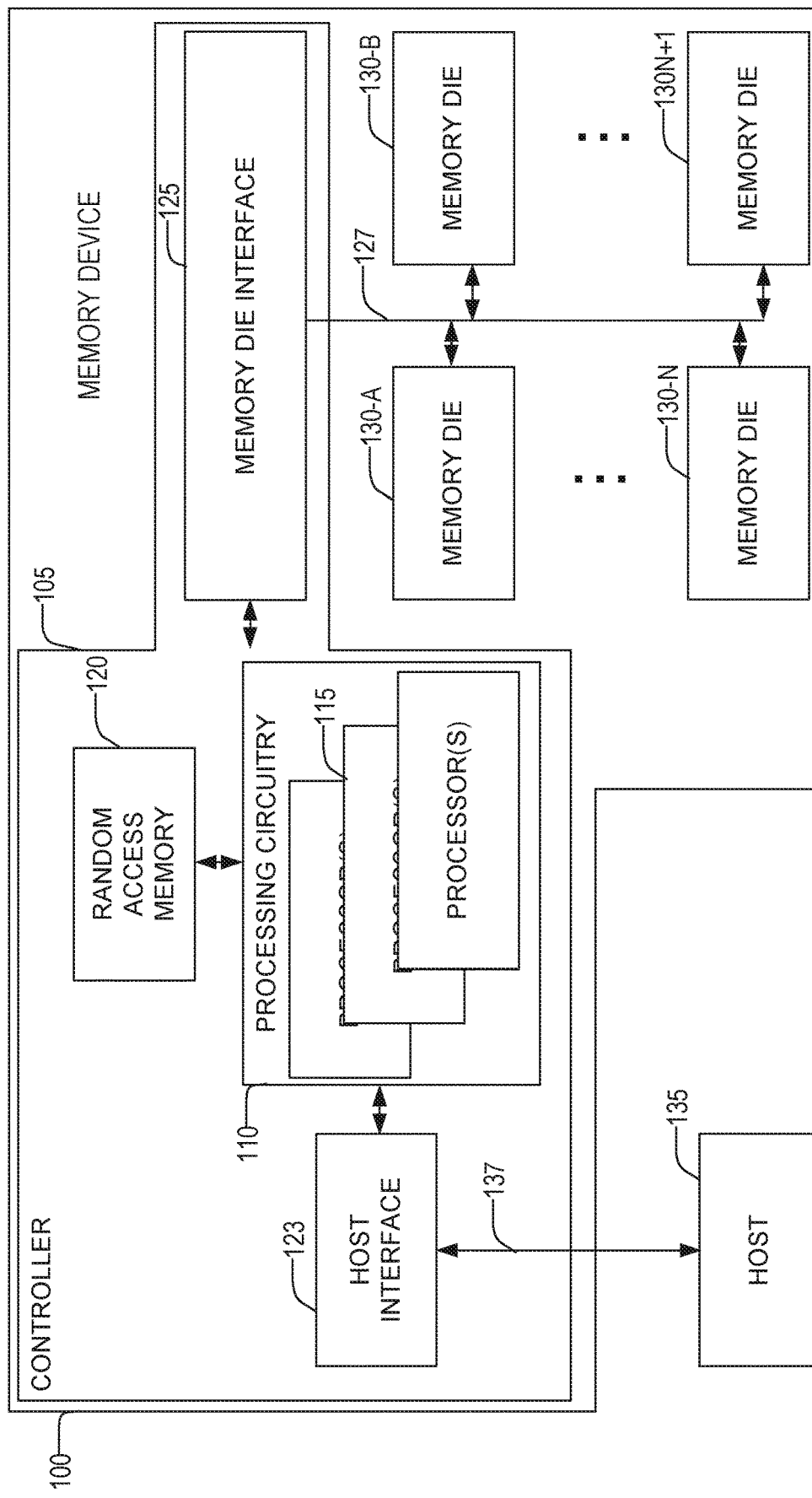
FIG. 1 illustrates a diagram of a memory device, such as a storage device according to some examples of the present disclosure.

Memory devices are often composed of multiple physical memory dies connected to a controller via an internal communication interface such as a bus. Certain operations of the memory device require copying data from cells in one location on a die to another location on a same die. One example is a copy operation from an SLC cache block to a TLC/QLC storage block. Many TLC/QLC memory systems use SLC blocks as a write cache for performance reasons. When data in these SLC cache blocks need to be moved to slower (but denser) TLC/QLC blocks, a copy operation is needed. Traditional approaches have transferred the data from the die to the controller over the internal communication interface for processing, and then back over the internal I/O bus to a die for storage in the different location.

In order to reduce I/O bus traffic and to reduce the utilization of the controller, internal copyback operations can be performed where data is moved from one location to another location in a same memory die of the memory device without transferring the data to the controller over the communication interface. Use of internal copyback operations saves controller resources (e.g., processing cycles and working memory), interface bandwidth, lowers energy consumption, and has lower latency in completing the operations. As the memory die does not have the resources to process the data in the same way as the controller, an internal copyback operation does not process the data in any computation-intensive way. Typically, the internal copyback copies the data without any modifications or processing.

Writing the data without modifications or processing may impact reliability of the memory device and the data written. This lack of processing may cause issues for internal copyback operations. While individual memory dies may be modified to perform these processing steps, this would unacceptably increase the cost and complexity of these devices.

For example, a randomizer is typically used in memory devices because the data pattern stored in the memory cells must satisfy certain requirements to meet reliability targets. As will be described later, NAND flash memory cells are arranged in a grid with wordlines (WL) connecting memory cells in rows and bitlines (BL) connecting cells in columns. NAND memory devices typically ensure that the bits stored in each WL have an approximately equal number of 0s and 1s, and the bits stored in each BL to have approximately equal number of 0s and 1s. In addition, if each memory cell stores more than 1 bit, such as in MLC/TLC/QLC, there're more than two threshold voltage states in each cell. In these examples, memory devices ensure that the number of cells in each state are approximately equal within a same WL. By ensuring this data pattern distribution, it reduces storage errors.

These data pattern distribution requirements are typically met through use of a scrambler. While the memory system cannot control what data pattern the user may choose to write, a scrambler "scrambles" the data to be written, such that a balanced number of 0s/1s are more likely to be programmed to the media. The scrambler can be implemented in a controller, or within a memory die itself.

Increased reliability is gained by storing a balanced number of ones and zeros across both the wordlines and the bitlines. Typically, the distribution requirements along the BL and for multiple pages in the same WL are met by ensuring proper scrambler seeding. Physical address-based seeding is widely used for this purpose. For example, an incoming word to be written is XORed with a random sequence seeded by the physical address of the page to which the word is written. When reading the data, the data that is read is then XORed again with the physical address to produce the unscrambled data. Using physical page address as part of or the entirety of the scrambler seed generally ensures that even if the same data pattern is written to each page in the block, the data programmed to the media is randomized across the bitlines.

Physical address-based scrambler seeding is not compatible with internal copyback. As already discussed, internal copyback normally does not alter the data that is copied. If the scrambler were to use a physical page address to perform the scrambling (e.g., the scrambler is "seeded" with the physical page), after an internal copyback operation completes the physical address of the page will have changed. Attempts to unscramble the data during a read operation will fail if the current physical address of the data (e.g., the physical address after the internal copyback) is used to unscramble the data instead of the original physical address. While memory devices could provide a mechanism to track the original physical page of the data for decoding purposes, this may be too expensive in terms of the memory needed to store such data.

Another issue with internal copyback operations is updating meta-data created when the data was first written. This meta-data is written along with the data received from the host (host-data). The meta-data may be data specific to conditions of the memory device at the time of the write operation. For example, the time the data was written, the temperature of the memory device during the initial write, write voltage, initial write verify indicators, and the like. These fields allow the memory device to more reliably read the host-data. As the internal copyback operation does not decode and unscramble the data, it cannot update this meta-data. Failure to update the meta-data can result in reliability and/or performance issues later (e.g., when trying to read the data later). While the memory die could decode the meta-data, update the values, and restore the data—this would require additional processing and volatile memory resources on the memory die. This increase the expense and complexity of each memory die.

Disclosed in some examples are methods, systems, devices, and machine-readable mediums that provide for techniques for scrambling and/or updating meta-data that enable an efficient internal copyback operation. In some examples, improved data distribution techniques decouple the scrambling key from a physical address to allow for copyback operations while maintaining data distribution requirements across a memory device. The controller may generate a seed value that is used by an algorithm to scramble the host-data and meta-data prior to the data being written. The seed value is then encoded and written to the page with encoded versions of the scrambled user data and meta-data—the random seed is written without scrambling the random seed. When reading the data, because the seed is stored with the data, it can be unscrambled easily. In some examples, the seed value is a random value generated by a random number generator.

In some examples, in order to update the meta-data, the meta-data and host-data are separated and the only the meta-data is sent to the controller to be updated during a modified internal copyback operation. The host-data is not transmitted to the controller. While sending the meta-data utilizes resources of the communication link between the memory dies and the controller, it uses much fewer resources than if the host-data were also transmitted. In order for the host-data and meta-data to be separately sent, the meta-data and the host-data are scrambled and encoded such that the meta-data can be separately unscrambled and decoded without the presence of the host-data. For example, by separately encoding and/or scrambling the host-data and meta-data.

By employing the above techniques, various issues with internal copyback operations may be avoided. First, since the physical address is not used as the key to the scrambler, the host-data and meta-data may be copied without modification from one memory location to another. Thus, data reliability gains made possible by scrambling the data may be retained while at the same time allowing for unscrambling of data that was subject to an internal copyback operation. Second, since the meta-data and host-data scrambled and encoded such that they can be separately unscrambled and decoded, the meta-data may be sent back to the controller for updating prior to completion of the internal copyback. This updates the meta-data while using a very small fraction of the communication and processing resources of the controller and the interface bandwidth between the memory dies and the controller.

Memory Device Overview

As previously noted, flash memory is utilized as non-volatile memory for a wide range of electronic applications. Flash memory typically includes one or more groups of transistors such as floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Flash memory cells in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storage cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), or one of various forms of managed memory device. Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards such as JEDEC standard JESD223D, entitled "JEDEC UFS Flash Storage 3.0," and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, such as a "host" as discussed later herein. In such managed memory devices, the controller functionality may be implemented on one or more die also incorporating a memory array, or on a separate die). In other examples, one or more memory devices may be combined with controller functionality to form a solid-stage drive (SSD) storage volume. The term "memory system," is used herein as inclusive of one or more memory die, and any controller functionality for such memory die, when present; and thus, includes individual memory devices, managed memory devices, and SSDs.

For purposes of the present description, example embodiments include managed memory devices implementing NAND flash memory cells, termed "managed NAND" devices. Such managed NAND devices may be constructed and operated generally in accordance with the described JEDEC UFS Flash Storage 3.0 specification, as may be modified as appropriate to incorporate the structures and functionality described herein. However, the described functionality may be implemented with other types of memory devices, as described above, which may incorporate other storage technologies, a few non-limiting examples of which were discussed earlier herein; and may be configured for operation in accordance with other industry standards, as discussed above; or in accordance with non-industry standard protocols.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

FIG. 1 illustrates a diagram of a memory device 100, such as a storage device according to some examples of the present disclosure. Memory device 100 may include one or more host interfaces 123 which may utilize one or more protocols such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces to communicate with a host device 135. Host 135 may send one or more commands, such as read comments, write commands, erase commands, and the like to the memory device 100 through the host interface 123. Host interface 123 may be part of controller 105 or may be implemented by separate circuitry.

Memory device 100 may include one or more controllers 105. Controller 105 may include processing circuitry 110 which may include one or more processors 115. Processors 115 may be general purpose hardware processors that execute firmware or other software instructions for performing operations of the memory device, including implementing the host interface 123 and memory die interface 125. In other examples, the processor(s) 115 may be special purpose hardware processors that are specifically designed to perform the operations of the memory device 100 through hardware logic and/or through the execution of software instructions. Processing circuitry 110 may also include logic circuits and other circuit components configured to perform various control functionality and memory management operations, or portions thereof, examples of which are described below.

In the depicted example, memory device 100 includes a host interface 123 providing communication through a host bus 137 to external host device 135. The configuration of host interface 123 may be of various forms depending upon the specific configuration of memory device 100 (which may also be termed a "memory system"). For example, in an example in which memory device 100 is a UFS device, the host interface will be in accordance with the applicable UFS standard.

Memory device 100 also incorporates one or more memory die interfaces 125 between the processing circuitry 110 of the controller 105 and at least some portion of the memory dies 130-A-130N+1 within memory device 100. Memory die interface 125 may be part of controller 105 or may be implemented by separate circuitry. For example, in the example of a UFS device, one or more of the memory die interfaces 125 will be a suitable memory interface, for example an Open NAND Flash Interface ("ONFI"), such as that defined by the ONFI 4.0 Specification, or later versions or revisions thereof.

Components of the memory device 100, such as controller 105, may include a random-access memory 120 for performing the operations of the memory device 100. The random-access memory 120 may be separate from the controller 105 or, as shown, may be integrated in the controller 105. In some examples, there may be random-access memory 120 both in the controller 105 and separate from the controller 105.

Figure 4:
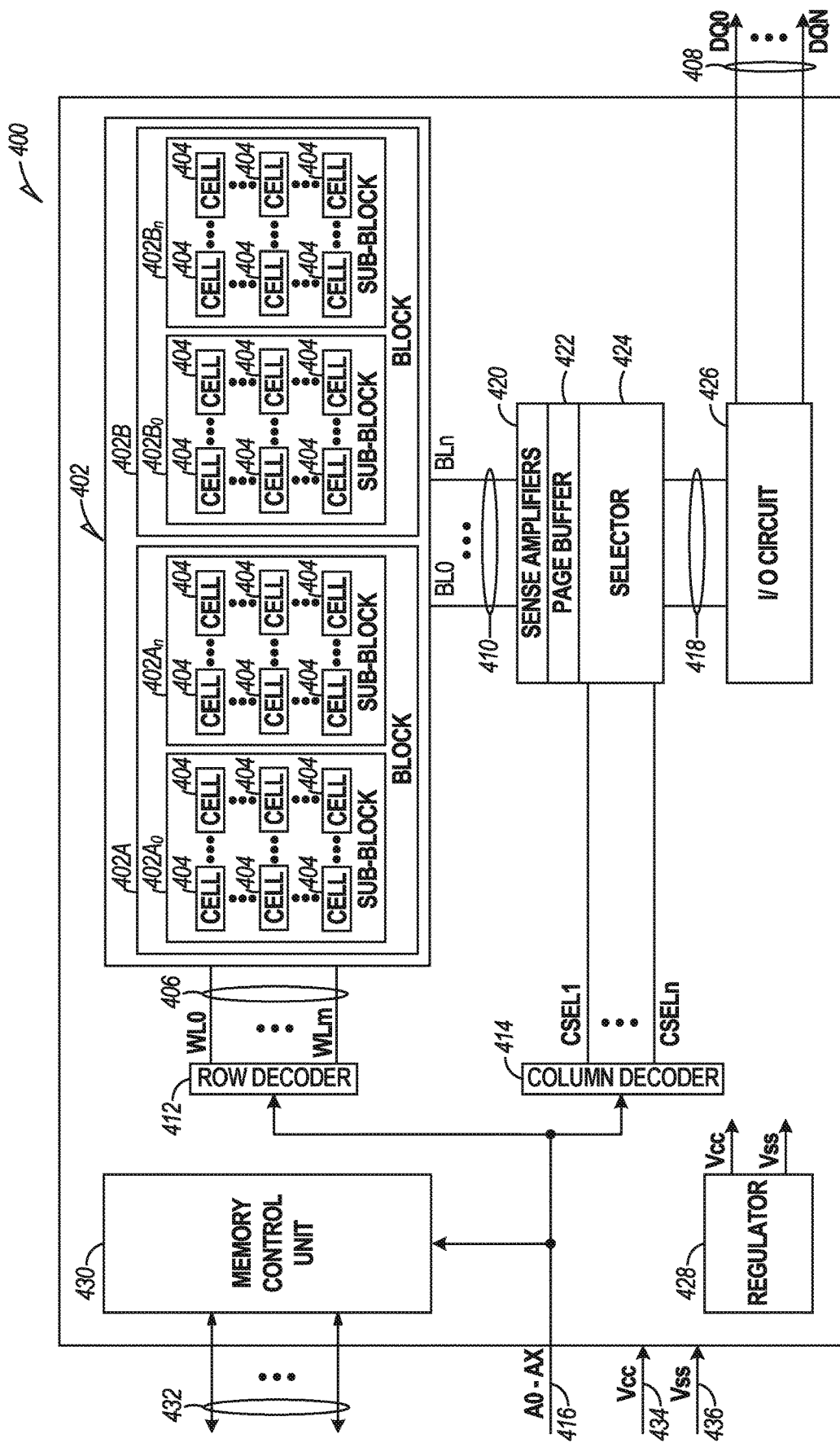
FIG. 4 illustrates an example block diagram of a memory die according to some examples of the present disclosure.

Controller 105 may handle one or more functions of the memory by interacting with the memory cells of the memory device that are part of one or more memory dies 130-A-130N+1. A schematic of an example implementation of a memory die 130 is shown in FIG. 4. The controller 105 may communicate with these memory dies through the memory die interface 125 across an internal communication interface 127, such as an I/O bus. In some examples, the memory dies may have their own device controllers, including processing circuitry and processors, to control operations on the respective memory die. Such device controllers may be formed on a common die with the device storage array or may be on a separate die from that containing the device storage array. Both configurations are embraced by the identified "memory die" (130A-N+1) described herein. Memory dies may be NAND dies, three-dimensional NAND dies, phase change memory dies, and the like.

The host device 135 may be a personal computer, a smartphone, a tablet, a portion of an integrated circuit, an Internet of Things (IoT) device (e.g., a refrigerator or other appliance, sensor, motor or actuator, mobile communication device, automobile, drone, etc.), or the like.

For purposes of the present description example memory operation and management functions may be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions.

The memory dies 130-A-130-N+1 can include several memory cells arranged in, for example, a number of planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the memory device 100 in pages and erased in blocks. However, one or more memory operations (e.g., read, write, erase, etc.) can be performed on larger or smaller groups of memory cells, as desired. The data transfer size of a memory device 100 is typically referred to as a page, whereas the data transfer size of a host is typically referred to as a sector.

Although a page of data can include a number of bytes of user data (e.g., a data payload including a number of sectors of data) and its corresponding meta-data, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, etc.) of meta-data corresponding to the user data, such as integrity data, address data (e.g., logical address data, etc.), or other meta-data associated with the user data.

Different types of memory cells can provide for different page sizes or can require different amounts of meta-data associated therewith. For example, different memory device types can have different bit error rates, which can lead to different amounts of meta-data necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more meta-data bytes for error data than the corresponding SLC device.

Figure 2:
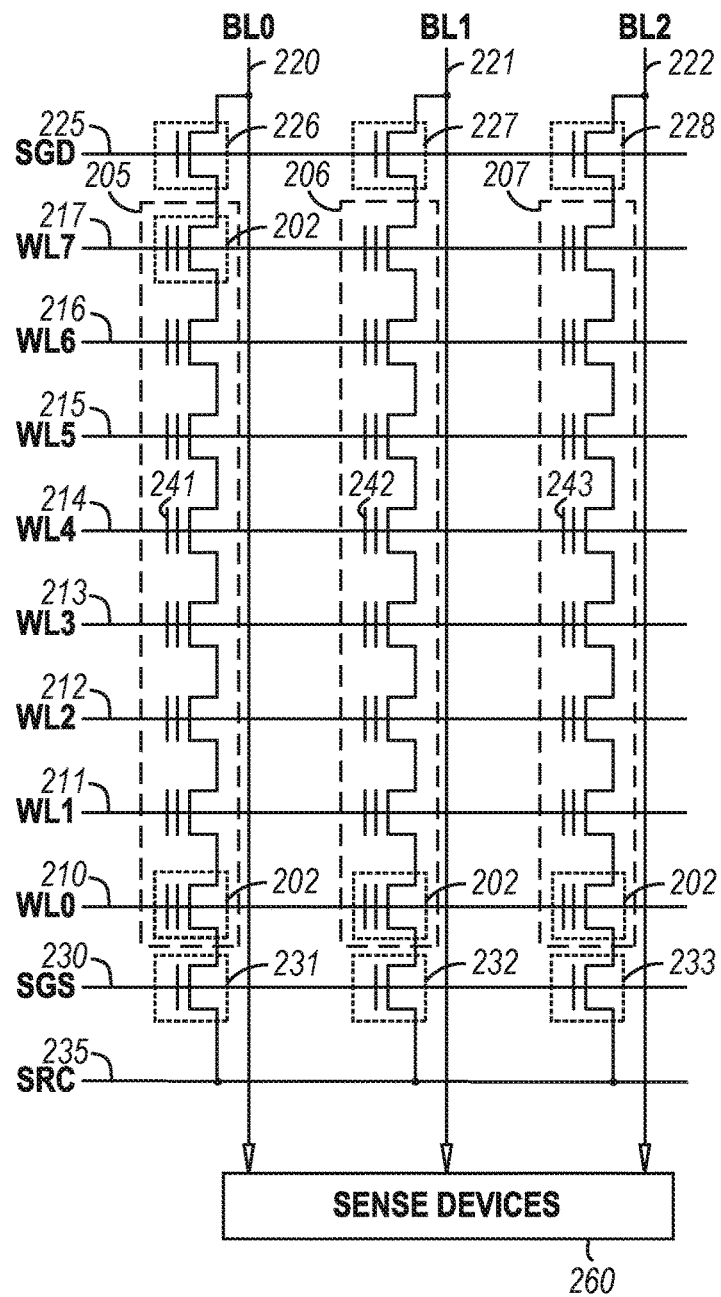
FIG. 2 illustrates an example schematic diagram of a portion of a NAND architecture semiconductor memory array according to some examples of the present disclosure.

FIG. 2 illustrates an example schematic diagram of a portion of a NAND architecture semiconductor memory array 300 including a plurality of memory cells 202 arranged in a two-dimensional array of strings (e.g., strings 205-207) and tiers (e.g., illustrated as respective word lines (WL) WL0-WL7 210-217, a drain-side select gate (SGD) line 225, a source-side select gate (SGS) line 230, etc.), and sense amplifiers or devices 260 according to some examples of the present disclosure. For example, the memory array 200 can illustrate an example schematic diagram of a portion of one physical page of memory cells of a memory die 130 from FIG. 1.

Each string of memory cells is coupled to a source line (SRC) 235 using a respective source-side select gate (SGS) (e.g., SGS 231-233), and to a respective data line (e.g., bit lines (BL) BL0-BL2 220-222) using a respective drain-side select gate (SGD) (e.g., SGDs 226-228). Although illustrated with 8 tiers (e.g., using word lines (WL) WL0-WL7 210-217) and three data lines (BL0-BL2 226-228) in the example of FIG. 2, other examples can include strings of memory cells having more or fewer tiers or data lines, as desired.

In a NAND architecture semiconductor memory array, such as the example memory array 200, the state of a selected memory cell 202 can be accessed by sensing a current or voltage variation associated with a particular data line containing the selected memory cell. The memory array 200 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., control gates (CGs) 241-243 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the charge storage structures of the targeted memory cells. Such charge storage structures may include, for example floating gates or charge trap regions of the respective memory cells. In floating gate memory cells charge is stored in an isolated polysilicon structure; while in charge trap memory cells the charge is typically stored in a dielectric structure.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the charge storage structures of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 260, coupled to one or more of the data lines (e.g., first, second, or third bit lines (BL0-BL2) 220-222), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

For Single Level Cells (SLC), there are two possible voltage levels programmed into the cell, one voltage level represents a binary '1' and another voltage level represents a binary '0' For Multi-Level Cells (MLC), there are four possible voltage levels programmed into the cell. The four possible voltage levels represent '00', '01', '10', and '11'. To program an MLC cell, multiple programming pulses are applied. A first pulse programs a first "page" of data that represents either the most significant bit or least significant bit of the cell. A second pulse programs the second "page" of data that represents the other bit of the cell that was not programmed by the first pulse. Similarly, Triple Level Cells (TLC) store eight possible voltage levels and Quad Level Cells (QLCs) store 16 possible voltage levels.

To read a value stored in one or more memory cells, a read voltage is applied to the wordline of the selected cells. If the voltage stored in the cells of the wordline is greater than the read voltage, the cell passes a voltage to the sense amplifier. For an SLC cell, the read voltage is selected to be between the two voltages representing a '1' and a '0.' For MLC, TLC, and QLC, multiple read operations are used to read each bit stored in the cell—each read operation utilizes a different read voltage.

To erase a memory cell or a group of memory cells (e.g., erasure is typically performed in blocks or sub-blocks), an erasure voltage (Vers) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the charge storage structures of the targeted memory cells to the channels.

Figure 3:
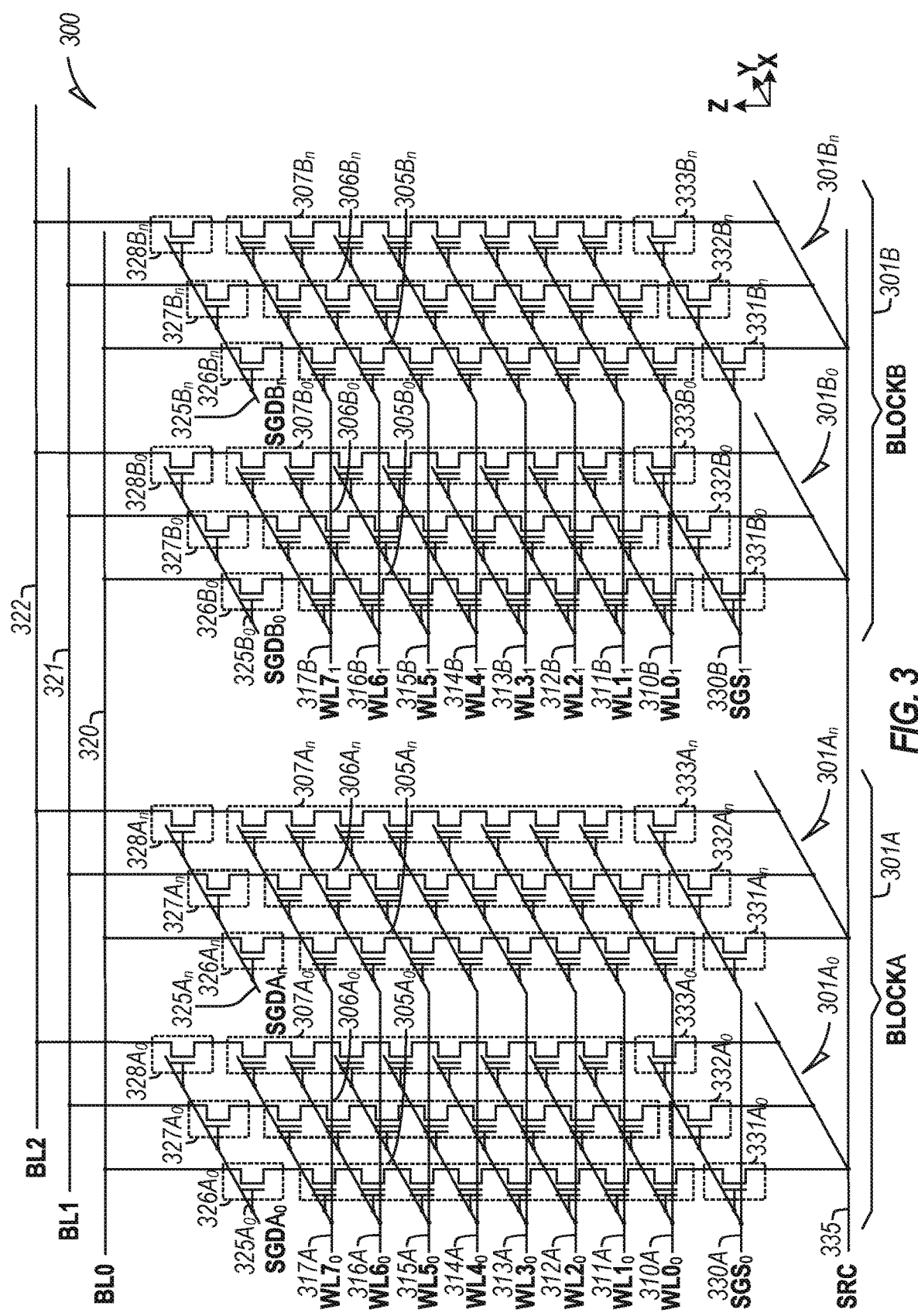
FIG. 3 illustrates an example schematic diagram of a 3D NAND architecture semiconductor memory according to some examples of the present disclosure.

FIG. 3 illustrates an example schematic diagram of a 3D NAND architecture semiconductor memory array 300 including a number of strings of memory cells (e.g., $A_0$ memory strings $305A_0$-$307A_0$, $A_n$ memory strings $305A_n$-$307A_n$, $B_0$ memory strings $305B_0$-$307B_0$, $B_n$ memory strings $305B_n$-$307B_n$, etc.), organized in blocks (e.g., block A 301A, block B 301B, etc.) and sub-blocks (e.g., sub-block $A_0$ $301A_0$, sub-block $A_n$ $301A_n$, sub-block $B_0$ $301B_0$, sub-block $B_n$ $301B_n$, etc.). The memory array 300 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 335 or a source-side select gate (SGS) (e.g., $A_0$ SGS $331A_0$-$333A_0$, $A_n$ SGS $331A_n$-$333A_n$, $B_0$ SGS $331B_0$-$333B_0$, $B_n$ SGS $231B_n$-$233B_n$, etc.) and a drain-side select gate (SGD) (e.g., $A_0$ SGD $326A_0$-$328A_0$, $A_n$ SGD $326A_n$-$328A_n$, $B_0$ SGD $326B_0$-$328B_0$, $B_n$ SGD $326B_n$-$328B_n$, etc.). Each string of memory cells in the 3D memory array can be arranged along the X direction as data lines (e.g., bit lines (BL) BL0-BL2 320-322), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 300 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 300 includes a control gate (CG) coupled to (e.g., electrically or otherwise operatively connected to) an access line (e.g., word lines (WL) $WL0_0$-$WL7_0$ 310A-317A, $WL0_1$-$WL7_1$ 310B-317B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, $A_0$ SGD $326A_0$-$328A_0$ can be accessed using an $A_0$ SGD line $SGDA_0$ $325A_0$, $A_n$ SGD $326A_n$-$328A_n$ can be accessed using an SGD line $SGDA_n$ $325A_n$, $B_0$ SGD $326B_0$-$328B_0$ can be accessed using an $B_0$ SGD line $SGDB_0$ $325B_0$, and $B_n$ SGD $326B_n$-$328B_n$ can be accessed using an $B_n$ SGD line $SGDB_n$ $325B_n$. $A_0$ SGS $331A_0$-$333A_0$ and $A_n$ SGS $331A_n$-$333A_n$ can be accessed using a gate select line $SGS_0$ 330A, and $B_0$ SGS $331B_0$-$333B_0$ and $B_n$ SGS $331B_n$-$333B_n$ can be accessed using a gate select line $SGS_1$ 330B.

In an example, the memory array 300 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

FIG. 4 illustrates an example block diagram of a memory die 400 including a memory array 402 having a plurality of memory cells 404, and one or more circuits or components to provide communication with, or perform one or more memory operations on, the memory array 402 according to some examples of the present disclosure. The memory die 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks $402A_0$, $402A_n$, and the second block 402B can include first and second sub-blocks $402B_0$, $402B_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory die 400 according to one or more signals and/or instructions/commands received on control lines 432 at a memory interface with a memory controller (as described relative to controller 105 and host interface 123 of memory device 100 of FIG. 1. Such signals and/or instructions may include, for example, one or more clock signals and/or control signals that indicate a desired operation (e.g., write, read, erase, etc.), or address signals (A0-AX) received on one or more address lines 416. One or more devices external to the memory die 400 can control the values of the control signals on the control lines 432, or the address signals on the address line 416. Examples of devices external to the memory die 400 can include, but are not limited to, a host, a memory controller, a processor, or one or more circuits or components not illustrated in FIG. 4.

The memory die 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory die 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory die 400, such as a controller 105, can communicate with the memory die 400 using the I/O lines (DQ0-DQN) 408, address lines 416 (A0-AX), or control lines 432. The input/output (I/O) circuit 426 can transfer values of data in or out of the memory die 400, such as in or out of the page buffer 422 or the memory array 402, using the I/O lines 408, according to, for example, the control lines 432 and address lines 416. The page buffer 422 can store data received from the one or more devices external to the memory die 400 before the data is programmed into relevant portions of the memory array 402 or can store data read from the memory array 402 before the data is transmitted to the one or more devices external to the memory die 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418. In some examples a flash translation layer (not shown) can map addresses provided by a host to physical memory addresses used by the row decoder 412 and column decoder 414 to read data in the memory array 402.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Internal Copyback-Enabled Scrambler

As previously described, utilizing a physical page address to scramble data when writing to the memory device to meet data pattern requirements does not allow internal copyback operations when the internal copyback operations do not modify the data and instead directly copy data located in one location to another location on the die. As the address changes from the address at which the data was original written, the physical address of the cells in which the data is currently stored cannot be used to unscramble the data after the internal copyback operation.

As previously described, the present disclosure recites methods, systems, and machine-readable mediums which provide for a seed generator to generate a seed value, the seed value used by a scrambler to scramble one or both of the host-data and meta-data, either together or separately. The seed is then appended to the scrambled host-data and meta-data and written to the memory device. Any subsequent internal copyback operation may copy the data exactly as its written—including the seed. A read operation then unscrambles the data read from the memory device by reading the seed first (which is stored unscrambled), then using that seed to reverse the scrambling operation to obtain the host-data and meta-data. This read operation works even after an internal copyback operation due to the storage of the seed for the scrambler in an unscrambled state along with the data written to the memory device.

As noted, in some examples, a same seed value is used by the scrambler to scramble and unscramble the data, but in other examples, a different value is used to unscramble the data than was used to scramble the data. For example, a first cryptographic key of a key pair may be used to scramble (by encrypting) one or both of the host-data and meta-data and a second cryptographic key of a keypair may be used to unscramble the data. In these examples, the value used by the unscrambler to unscramble the data (e.g., the second key) is stored with the data.

Figure 5:
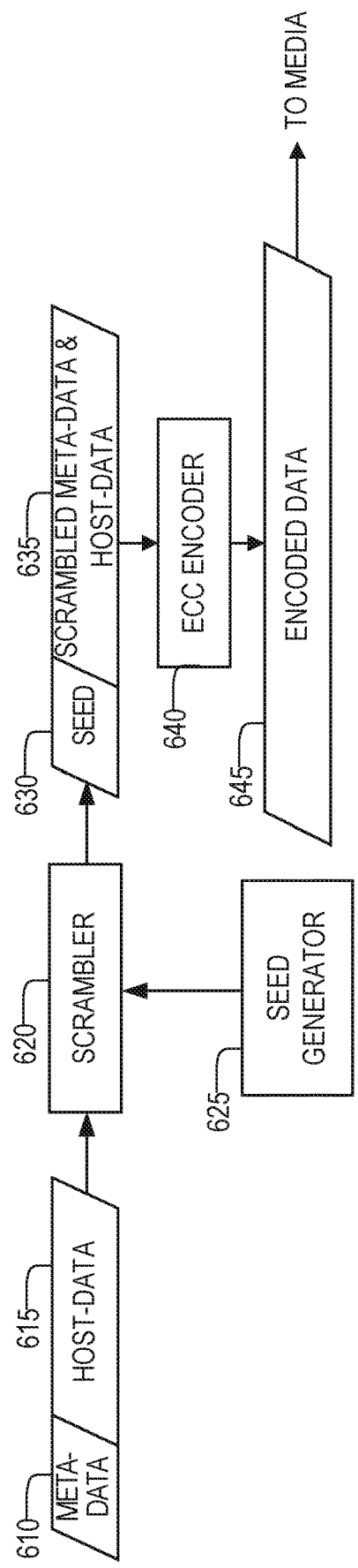
FIG. 5 illustrates a data flow of a write operation according to some examples of the present disclosure.

FIG. 5 illustrates a data flow of a write operation according to some examples of the present disclosure. Host-data 615 is received from the host for writing to the memory device. The meta-data 610 is created by the memory device such as by the controller 105, memory die 130, or portions of the meta-data 610 may be created by both controller 105 and memory die 130. Meta-data may include information about the host-data and the conditions on which it was stored—such as the write temperature and other details.

The host-data 615 and meta-data 610 are then input to the scrambler 620. Scrambler 620 may be any algorithm that may reversibly transform the host-data 615 and meta-data 610 into different values using one or more seed values. For example, an XOR operation, an encryption operation (e.g., RSA, Data Encryption Standard, Triple DES, RSA, Blowfish, Advanced Encryption Standard (AES), etc), or the like. One of ordinary skill will appreciate that multiple seed values may be utilized, e.g., for scrambler algorithms that utilize multiple keys or other values that are utilized for unscrambling the meta-data and host-data, or in some examples, the meta-data and host-data may be split up and scrambled with different seeds. In examples in which multiple seeds are utilized, each seed that is used for unscrambling the data may be stored with the scrambled host-data and meta-data.

The seed 630 may be used by the scrambler to produce a scrambled meta-data and host-data 635. The seed 630 may be generated by a seed generator 625. In some examples, the seed generator 625 may be a random number generator. Seed generator 625 may be a hardware random number generator, a software random number generator or the like. The seed generator 625 may be a true random number generator or a pseudo random number generator. In other examples, the seed generator 625 may be a cryptographic key generator, or the like. Seed generator 625 may select from a previously determined list of seed values or may generate new seed values (e.g., based upon a formula or execution of hardware logic). Each seed may be generated specifically in response to the receipt of the host-data 615 such that a first seed for first host-data may be different than a second seed for a later received host-data.

In some examples, the seed generator 625 may need to be seeded. For example, if the seed generator 625 is a pseudo-random number generator, the seed generator may be seeded initially, at each startup of the memory device, periodically, and/or the like. The seed generator 625 may be seeded by a current time, a current temperature, a physical address that corresponds to a last written word of the memory device or a portion of the memory device (e.g., a die), a physical address that is next to be written, and the like. As noted, the seed generator may have the seed periodically refreshed (e.g., after a predetermined time period).

Each page written to the memory device may have a seed generated or selected for that page and used by the scrambler to scramble the host-data and/or meta-data. In some examples a single seed is generated for both the meta-data and host-data, but in other examples a different seed is generated for the meta-data and the host-data. In some examples, the seed 630 and scrambler 620 are operable to scramble the host-data and meta-data such that the host-data and meta-data may be unscrambled independently of the other such that the meta-data can be unscrambled without knowing the host-data.

Once the seed is generated and used, it is appended to the scrambled meta-data and host-data (as shown, before the scrambled meta-data and host-data, but it could be after the scrambled meta-data and host-data). The combined seed and scrambled meta-data and host-data is then encoded with an Error Correction Coding Encoder 640 to produce encoded data 645 which is programmed to the memory cells of the memory device.

Figure 6:
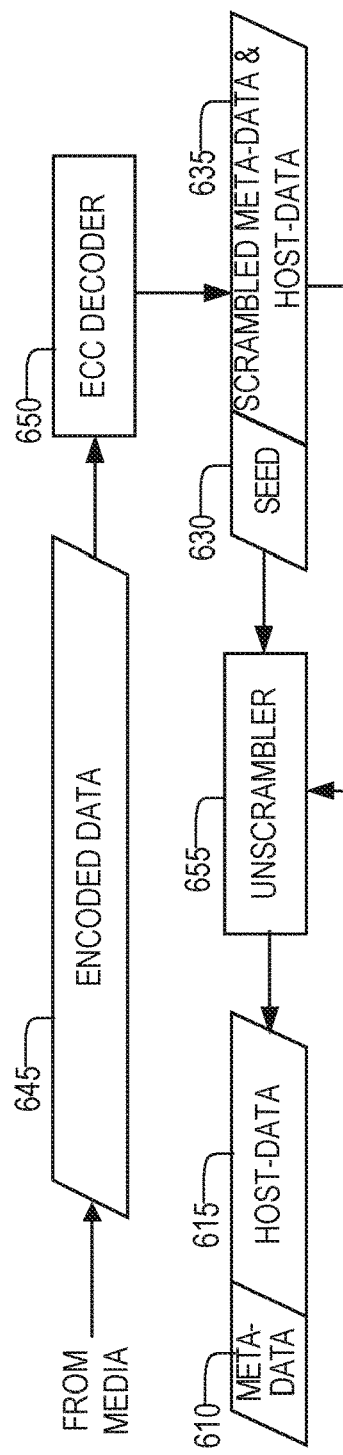
FIG. 6 illustrates a data flow of a read operation according to some examples of the present disclosure.

FIG. 6 illustrates a data flow of a read operation according to some examples of the present disclosure. A host sends a read request with a logical address to the memory device. The memory device converts this to a physical address using a logical-to-physical (L2P) table. The command is then issued to the appropriate memory die corresponding to that physical address. The memory cells at that physical address are then read by applying appropriate read voltages to the memory cells. The resulting encoded data 645 is then decoded with an ECC decoder 650. If the ECC decoding succeeds, the scrambled meta-data and host-data 635 and seed 630 are recovered. The seed is then used by the unscrambler 655 to unscramble the scrambled meta-data and host-data 635 into the original meta-data 610 and host-data 615. Unscrambler 655 may apply an inverse operation to the operation performed by the scrambler 620. For example, if scrambler 620 applies an XOR operation to XOR the meta-data 610 and host-data 615 with the random sequence with seed 630; the unscrambler 655 applies the XOR operation and XORs the random sequence with the seed and the scrambled meta-data and host-data 635 to obtain the unscrambled meta-data 610 and host-data 615.

Figure 7:
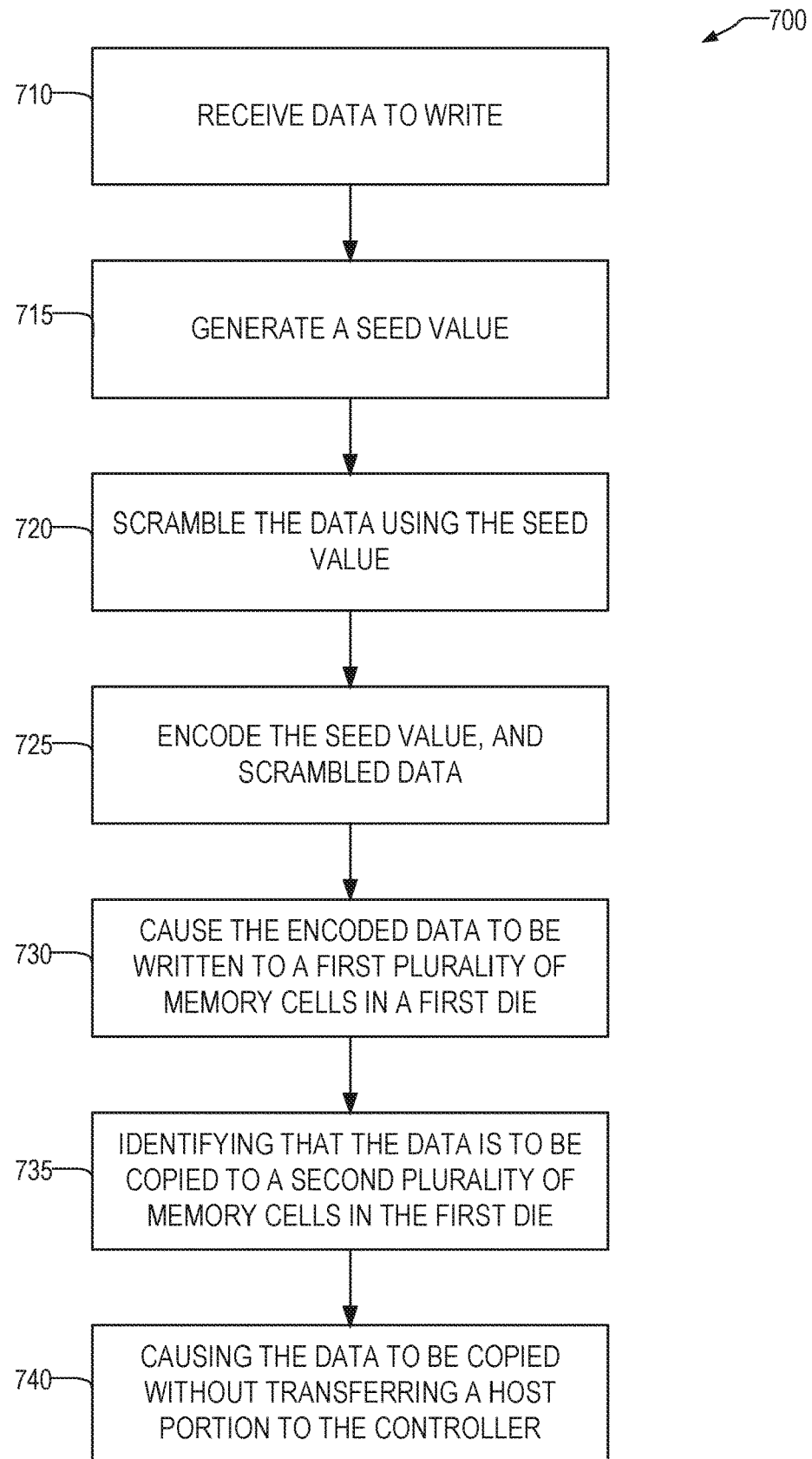
FIG. 7 illustrates a flowchart of a method of writing data to a memory device according to some examples of the present disclosure.

FIG. 7 illustrates a flowchart of a method 700 of writing data to a memory device according to some examples of the present disclosure. At operation 710 the memory device may receive data to write to the memory cells. For example, a host may instruct the memory device to write host-data to the memory device. With this instruction, the host may provide host-data to write to the memory device.

At operation 715, a seed value may be generated. The seed value may be generated responsive to the receipt of data to write (e.g., by being generated contemporaneously with the time the data is received). The seed value may be an integer value. The seed value may be newly generated or selected each time the memory devices writes new data to the memory cells. A particular seed value may be different than a previously generated seed value. In some examples, seed values may be unique within a particular plane, a particular die, a particular memory device, or the like. In other examples, seed values may not be unique, but may be repeated eventually after a sequence of different seed values. Seed values may be random, or pseudorandom. As noted, the seed value may be a randomly generated value, an encryption key, or the like.

At operation 720 the data to be written may be scrambled using the seed value. For example, the data received in operation 710 may be combined with meta-data generated by the memory device and may be transformed by a scrambling algorithm using the seed value. For example, the algorithm may be an XOR algorithm and the data and the meta-data may be XORd with the seed to produce a scrambled value. In other examples, the data and the meta-data may be encrypted with the seed. The scrambling algorithm may be any algorithm that takes at least two inputs (the data (e.g., the combined host-data and meta-data), and the seed value), and produces an output that is different than the data while also being reversible in that a function may convert the scrambled data using the seed value to the original data. In some examples, the meta-data and host-data may be scrambled such that the meta-data may be unscrambled without knowledge of the host-data. In some examples, to accomplish this, the meta-data and host-data may be separately scrambled with a same or a different seed. If the host-data and meta-data are scrambled with different seeds, each seed may be stored along with the encoded and scrambled meta-data and host-data (e.g., operation 730).

At operation 725, the seed value may be concatenated with the scrambled data (e.g., the host-data and the meta-data) and encoded. For example, using an Error Correction Coding (ECC) scheme. This encoded data may then be caused to be written to a first plurality of memory cells of a die of the memory device (e.g., denoted as a first die) at operation 730. For example, the encoded data may be written to a series of memory cells forming a word of the memory device. As noted, if multiple seed values are utilized, multiple seed values may be concatenated and stored with the host-data and meta-data.

At operation 735, the memory device may later identify that the data is to be copied to a second plurality of memory cells of the first die—the first and second pluralities being different memory cells. For example, the first plurality of memory cells may comprise an SLC cache and the data may need to be moved out of the cache to MLC, TLC, or QLC storage. At operation 740, the data may be copied to the second plurality of memory cells. In some examples, none of the data is transferred over an internal communications interface of the memory device (e.g., to a controller). In some examples, as will be discussed below, a meta-data portion may be transferred across an internal communications interface of the memory device (e.g., to a controller) where the meta-data is updated and transferred back where it is combined with the host-data for storage during the internal copyback. In these examples, the host-data portion is not transferred across the internal communications interface of the memory device (e.g., the controller)—only the meta-data. In still other examples, both the host-data and the meta-data may be transferred over the internal communications interface of the memory device (e.g., to the controller) and then transferred back to be stored in the second plurality of cells. Operations 735 and 740 may happen independently of operations 710-730. That is, the copyback operations described in operations 735-740 may happen at a later time, or not at all.

Figure 8:
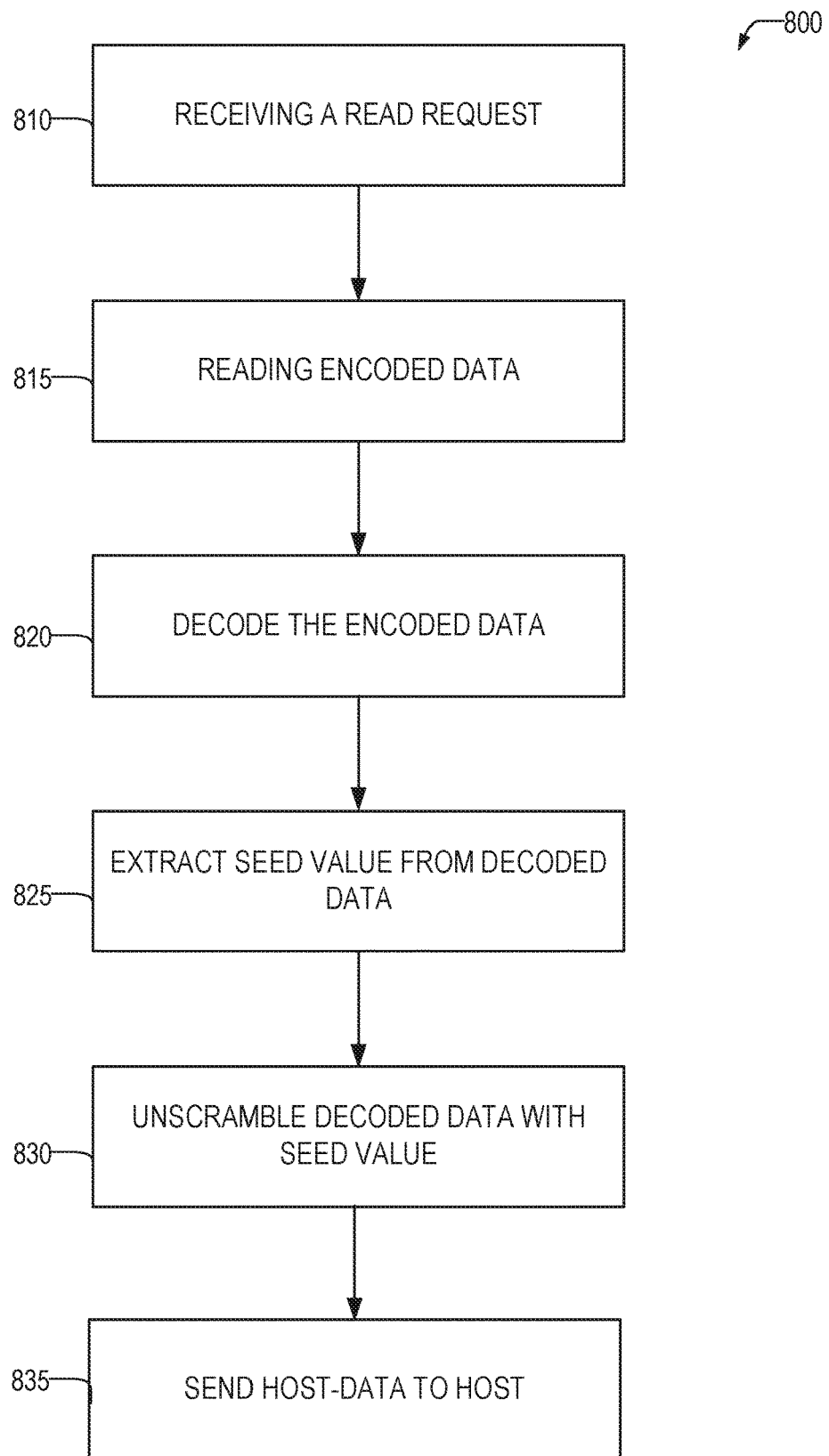
FIG. 8 illustrates a flowchart of a method of read data from a memory device according to some examples of the present disclosure.

FIG. 8 illustrates a flowchart of a method 800 of read data from a memory device according to some examples of the present disclosure. At operation 810 the memory device may receive a request to read data stored in the memory device. For example, a host may request the data stored in a particular logical address of the memory device. At operation 815, data is read from the memory device at the indicated location. The data that is read is encoded. At operation 820, the encoded data is decoded. The decoded data includes one or more seed values and the scrambled data (host-data and meta-data). At operation 825, the seed value(s) are extracted from the decoded data. For example, the seed value may be stored before, after, or adjacent to the scrambled data (e.g., the host-data and meta-data). At operation 830, the scrambled data may be unscrambled with the seed value by the unscrambler. The unscrambler may be any algorithm that applies a reverse transformation to the scrambler. The host-data is then sent to the host at operation 835. In some examples, the host-data may be further processed prior to sending to the host at operation 835.

Meta-Data Update

As previously described, traditional internal copyback operations do not decode and unscramble the data and therefore do not update the appropriate meta-data associated with the host-data. This may cause reliability issues as these metadata values may be used to properly read the host-data. In some examples, to solve this problem, the meta-data may be separated from the host-data and only the meta-data may be sent across the internal I/O interfaces to be updated by the controller. The updated meta-data is then sent back to the memory die and combined with the host-data (which may be stored in a memory buffer while waiting for the updated host-data) and written to the new location on the die. While sending the meta-data does impact the internal I/O interfaces, the amount of I/O utilized is typically less than 1% of the I/O required to send both the meta-data and host-data back to the controller.

Under prior methods, the host-data and the meta-data are scrambled and encoded together. If the host-data is not transferred along with the meta-data, the controller cannot properly update the ECC information stored with the data (e.g., ECC parity bits). This will lead to incorrect decoding as the ECC information is calculated based upon both the host-data and meta-data. In some examples, to solve this problem, the memory device may apply a separate ECC process to the meta-data and the host-data along with storing separate ECC information for the meta-data and host-data (e.g., separate parity bits). When the meta-data is updated and encoded, the parity bits associated with the meta-data are updated. The host-data ECC information is not affected and need not be updated as the host-data was not affected. Thus, the host-data may be properly decoded even though the meta-data has been modified.

Figure 9:
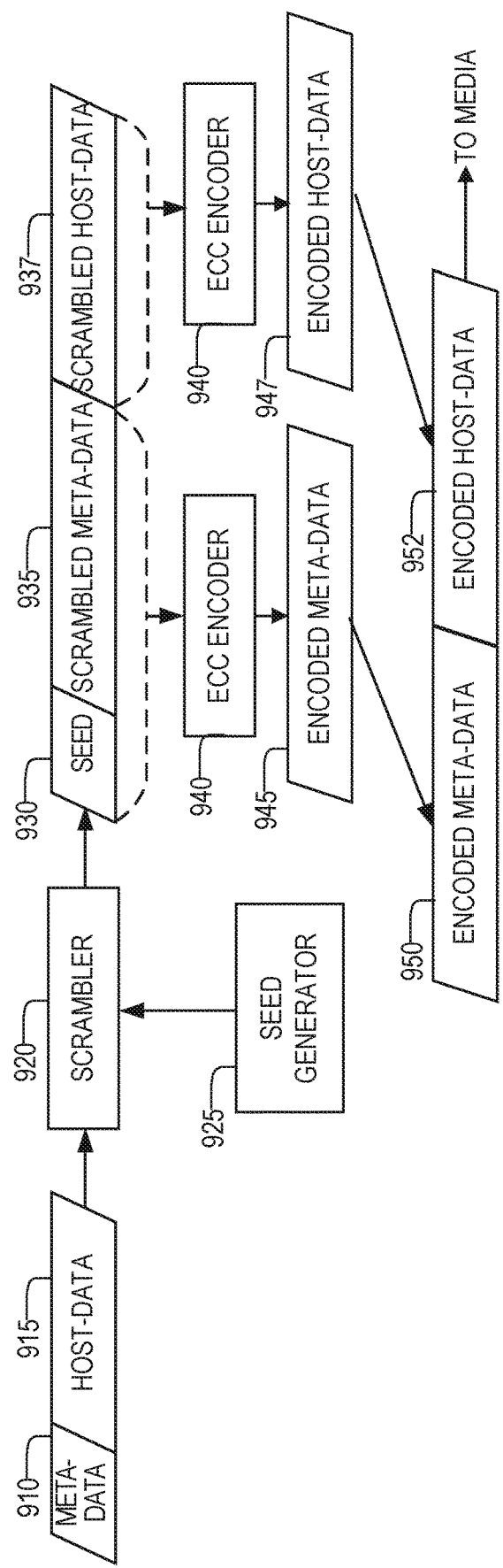
FIG. 9 illustrates a data flow of a write operation according to some examples of the present disclosure where the meta-data and host-data are separately encoded.

FIG. 9 illustrates a data flow of a write operation according to some examples of the present disclosure where the meta-data and host-data are separately encoded. Meta-data 910 and host-data 915 are input into the scrambler 920. Seed generator 925 generates seed 930 that is used to scramble the meta-data and the host-data to generate scrambled host-data 937. The meta-data and host-data may need to be scrambled in a manner that allows for unscrambling of the meta-data without the presence of the scrambled host-data to allow for updating the meta-data without also receiving the host-data.

This may be accomplished by utilizing a scrambling algorithm that does not utilize the host-data in calculating the scrambled meta-data. For example, an XOR operation that XORs the random sequence with the seed with the data in a bit-by-bit fashion can be reversed by applying a same XOR value with the scrambled data. In these examples, even if the metadata is separated from the host-data the unscrambling will still work. In these examples, a same seed value may be used to scramble the meta-data and the host-data.

In other examples, the meta-data 910 and host data 915 may be scrambled with different seed values. For example, if the scrambler 920 performs an operation (e.g., some encryption algorithms) where a both the meta-data and host-data would need to be present to unscramble (e.g., unencrypt) the data (e.g., a value of the unscrambled meta-data, the meta-data and host-data may be separately scrambled with separate seeds. In these examples, both seeds may be stored, or, if one seed can be deduced from the other, only one seed may be stored. In other examples, they may be a same seed value, but the scrambling operation is done such that knowledge of the host-data (either scrambled or unscrambled) is not required to unscramble the meta-data.

Scrambled meta-data 935 and seed 930 may be input to the ECC encoder 940 to produce encoded meta-data 945. Separately, the scrambled host-data 937 may be fed to the ECC encoder 940 to produce encoded host-data 947. The encoded meta-data 950 and encoded host-data 952 (along with ECC information such as parity bits) may then be written to the memory cells of the memory device. As shown, the seed 930 is encoded with the scrambled meta-data 935, but in other examples, the seed 930 may be encoded with the scrambled host-data 937, or both the scrambled meta-data 935 and the scrambled host-data 937.

Figure 10:
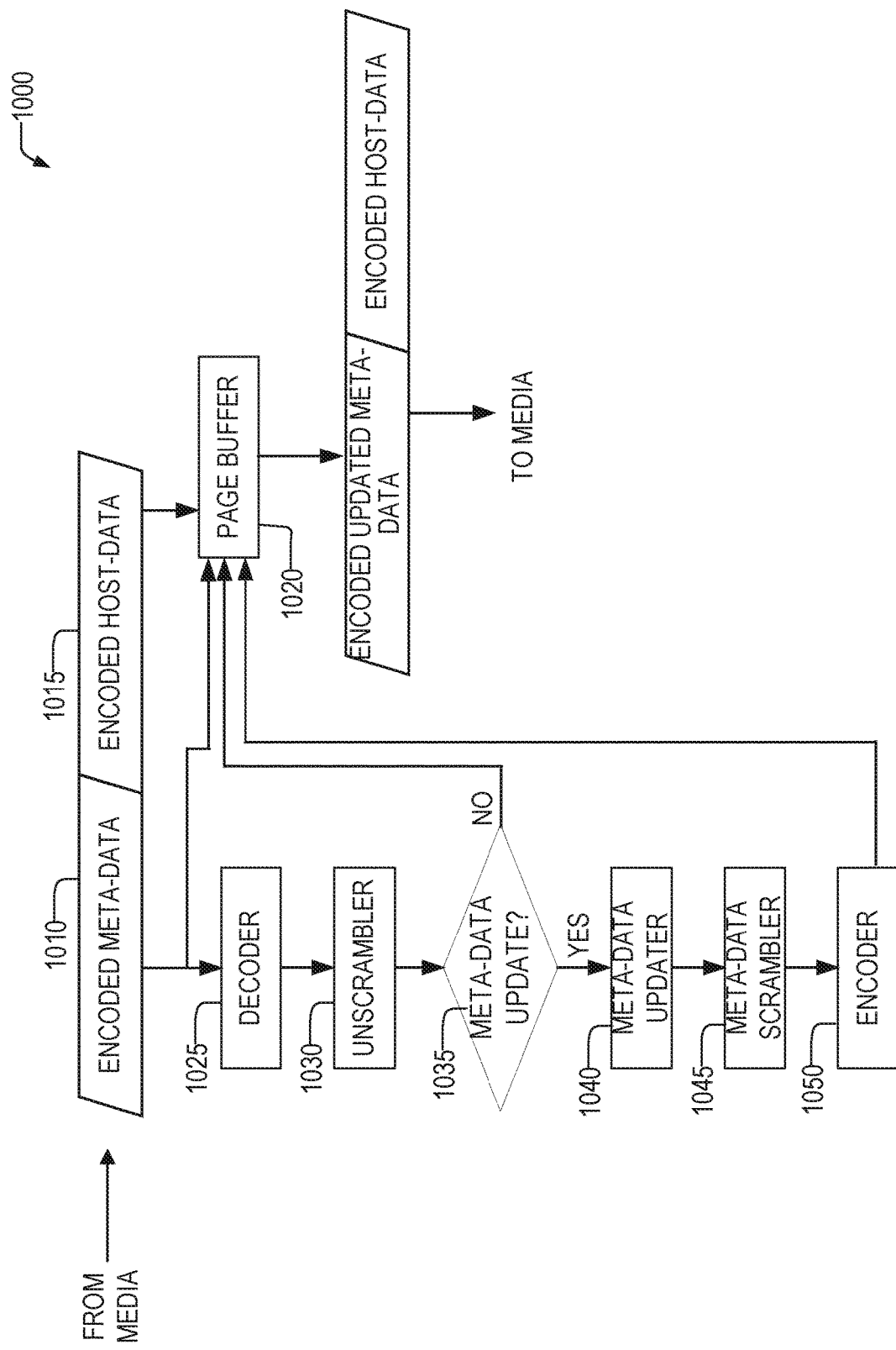
FIG. 10 illustrates a data flow of an internal copyback operation with meta-data update according to some examples of the present disclosure where the meta-data and host-data are separately encoded.

FIG. 10 illustrates a data flow 1000 of an internal copyback operation with meta-data update according to some examples of the present disclosure where the meta-data and host-data are separately encoded. The encoded meta-data 1010 and encoded host-data 1015 are read from the media. The encoded host-data 1015 is stored in a memory buffer—such as a page buffer 1020. In some examples, the encoded meta-data 1010 is also stored in the buffer (for cases where the meta-data does not need to be updated).

The encoded meta-data 1010 is transferred across a communication interface to a controller where the encoded meta-data 1010 is decoded by a decoder 1025 and unscrambled by a unscrambler 1030. ECC information such as parity data and the seed for the scrambler (which may be encoded with the meta-data, host-data, or both) may also be transferred to be used with the decoder 1025 and unscrambler 1030. If the meta-data fails ECC checks, the memory device may abort the internal copyback operation and enter recovery steps for the data.

The meta-data may be read, and at 1035 it may be determined whether the meta-data needs to be updated. For example, to update a drive write temperature, a write time, or the like. In the event that the meta-data does not need to be updated, an indication may or may not be sent back to the memory die. For example, a message indicating that no change is necessary. In other examples, even for cases in which the meta-data is not updated, the meta-data may be re-randomized, re-encoded and sent back. This has the benefit of ensuring the meta-data is error free. In some examples, if the meta-data that was written is sufficiently close (e.g., within a specified distance) the system may decide not to update the metadata. Thus, if the drive temperature at which the data was written initially is close to the current temperature, the meta-data may not be updated. In some examples, this determination is optional as the system may be configured to always update the metadata (e.g., update the write timestamp). In some examples, all meta-data is updated, and in other examples, only some fields of the meta-data are updated. In some examples, whether a particular field of meta-data is updated may depend on certain rules. For example, one particular field may always be updated, but other fields may only be updated if the rules evaluate to a result that indicates that the meta-data field should be updated. For example, the rule may be that if the current temperature is over a threshold difference than the temperature at which the data was initially written, then the write temperature may be updated, otherwise the write temperature may not be updated.

If it is determined that the meta-data needs to be updated at 1035, then the meta-data is updated by the meta-data updater 1040. For example, by incorporating various measurements from various sensors at the memory device (e.g., temperature, time, and the like). The scrambler 1045 then scrambles the updated meta-data using the same key that was originally used to scramble the meta-data. Encoder 1050 then encodes the scrambled and updated meta-data and generates new ECC information. The encoded meta-data with the associated updated ECC information (e.g., parity bits) are then sent back to the memory die, where it is combined in the page buffer 1020 with the encoded host-data. This combined updated meta-data and host-data is then written to the media.

Figure 11:
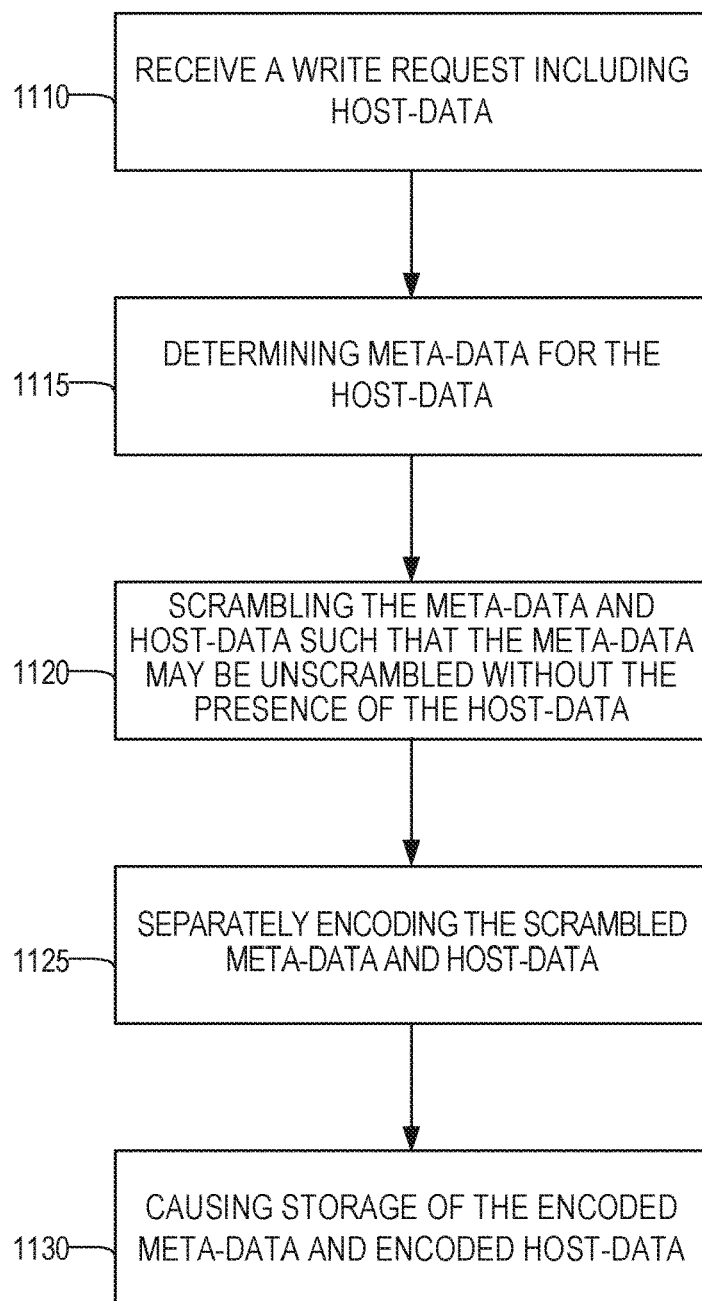
FIG. 11 illustrates a flowchart of a method of writing data to a memory device according to some examples of the present disclosure.

FIG. 11 illustrates a flowchart of a method 1100 of writing data to a memory device according to some examples of the present disclosure. FIG. 11 may be performed by a controller of the memory device, such as controller 105 of FIG. 1. At operation 1110, the controller may receive a write request including host-data. At operation 1115 the controller may determine meta-data corresponding to the host-data. For example, write temperature, time the data was written, and the like. At operation 1120, the controller scrambles the meta-data and host-data such that the meta-data may be unscrambled without knowing the host-data. Stated differently, the scrambling process does not utilize the host-data such that knowledge of the host-data is not required for unscrambling the meta-data. For example, the meta-data may be scrambled with a seed or key (either the same seed or key that is used to scramble the host-data or a different seed or key) in an operation separate from the host-data. In still other examples, for certain scrambling algorithms, no separate processing may be needed—that is, due to the nature of the scrambling algorithm, it allows independent unscrambling of the bits given the seed. For example, the values of the unscrambled bits of the meta-data do not depend on the values of any bits outside the meta-data (such as host-data) except for the value of the key.

At operation 1125, the scrambled host-data and meta-data are separately encoded with separate encoding information. At operation 1130, the controller may cause the encoded meta-data and encoded host-data to be stored in the memory device. For example, the controller may send a command across an internal communication interface to instruct a memory die to program physical word line(s) of memory cells to store the encoded meta-data and encoded host-data.

Figure 12:
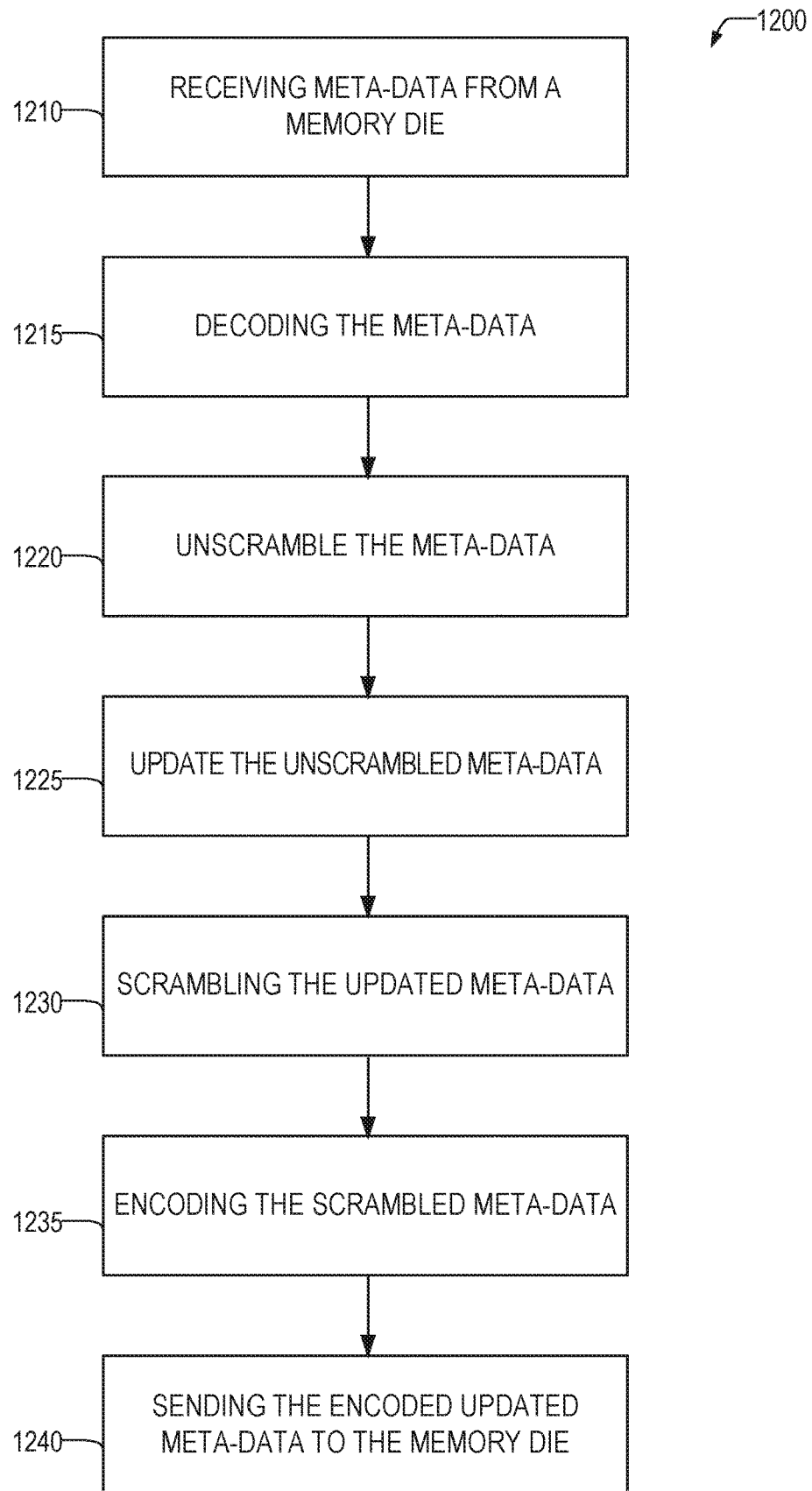
FIG. 12 illustrates a flowchart of a method of writing data to a memory device during an internal copyback operation according to some examples of the present disclosure.

FIG. 12 illustrates a flowchart of a method 1200 of writing data to a memory device during an internal copyback operation according to some examples of the present disclosure. FIG. 12 may be performed by a controller of the memory device, such as controller 105 of FIG. 1. At operation 1210, in response to an internal copyback command (either issued by the controller or generated within the memory die) the memory die may transmit, and the controller may receive meta-data that is encoded and scrambled. This meta-data is encoded and/or scrambled such that it can be decoded and/or unscrambled without the host-data. That is, the host-data is not transmitted by the memory die to the controller.

At operation 1215 the meta-data is decoded using the encoding information. As previously noted, if the decoding fails (e.g., there are uncorrectable ECC errors in the meta-data) the memory device cancels the internal copyback operation and tries to recover the data through a recovery operation. At operation 1220 the controller unscrambles the decoded meta-data from operation 1215. For example, by using a seed appended to the decoded meta-data, or a seed sent by the memory die. As previously described, the seed may not be scrambled. Operation 1220 unscrambles the decoded meta-data without knowledge of the host-data or data corresponding to the host-data. That is the unscrambling of operation 1220 does not need knowledge of the host-data, encoded host-data, scrambled host-data, encoded scrambled host-data, and the like.

At operation 1225 the unscrambled and decoded meta-data is then updated. For example, an updated write temperature, an updated write time, and the like. As previously noted, in some examples, the meta-data or fields of the meta-data may be selectively updated based upon the results of evaluation of one or more rules, the current meta-data, current memory device conditions (e.g., temperature, time, and the like), and the like. The meta-data may be updated with current memory device conditions. At operation 1230 the updated meta-data is scrambled with the seed. At operation 1235 the scrambled updated meta-data is encoded. At operation 1240 the encoded and scrambled updated meta-data is sent back to the memory die for combining with the stored scrambled and encoded host-data and writing to the memory cells.

Figure 13:
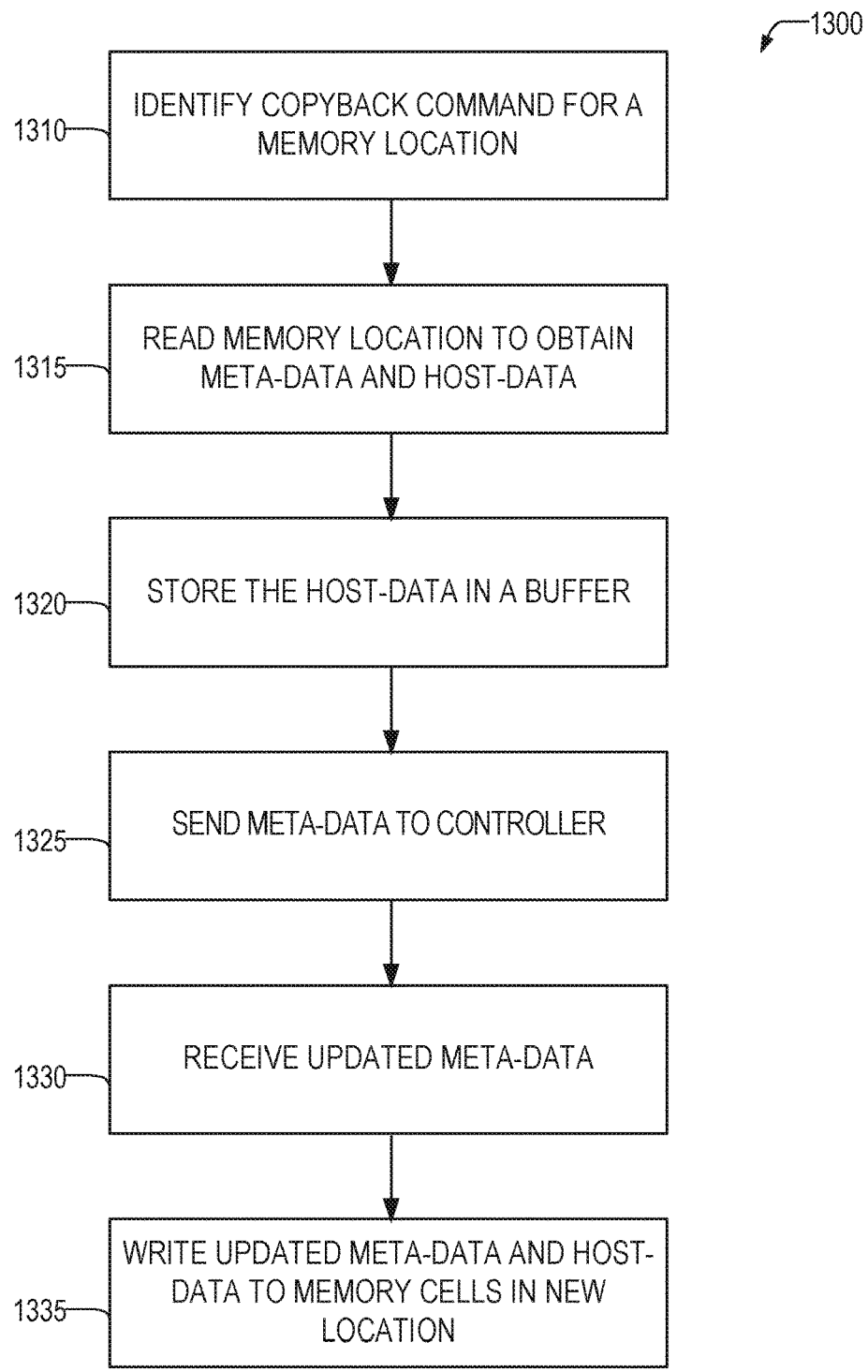
FIG. 13 illustrates a flowchart of a method of an internal copyback operation on a memory device according to some examples of the present disclosure.

FIG. 13 illustrates a flowchart of a method 1300 of an internal copyback operation on a memory device according to some examples of the present disclosure. FIG. 13 may be performed by a memory die of the memory device, such as memory die 130 of FIG. 1. The memory die 130 may have processing circuitry and working memory (e.g., volatile memory). The processing circuitry may be one or more processors which may be configured to perform the method 1300. At operation 1310, the memory die 130 may identify an internal copyback command for one or more memory locations in the memory die. For example, a command may be issued by the controller, various triggers may be identified to move data stored in memory cells corresponding to an SLC cache to MLC, TLC, or QLC storage, or the like. Various triggers may include idle time, SLC cache utilization, a controller command, or the like. Both the SLC cache and the eventual target MLC, TLC, or QLC storage may be on the same memory die. In these examples (e.g., the source and destination are identified to be on a same memory die), an internal copyback operation may be executed to copy the data (host-data and meta-data) from a first location on the die to a second location on the same die without transferring the entire data over the communications interface with the controller.

At operation 1315, the source memory location of the internal copyback is read to obtain the meta-data and host-data. This meta-data and host-data are both scrambled and encoded. At operation 1320 the encoded and scrambled host-data read from the source memory location is copied to a buffer—such as a page buffer. In some examples, the encoded and scrambled meta-data may also be copied to a buffer, such as a same page buffer as the encoded and scrambled host-data.

At operation 1325 the encoded and scrambled meta-data may be sent to the controller for updating over the internal communication interface (e.g., a communication bus). At operation 1330 the memory die may receive the updated meta-data or an indication that the meta-data does not need to be updated. At operation 1335, the memory die may write the encoded and scrambled updated meta-data (or the original meta-data if the meta-data does not need to be updated) along with the encoded and scrambled host-data to the destination memory cells.

Figure 14:
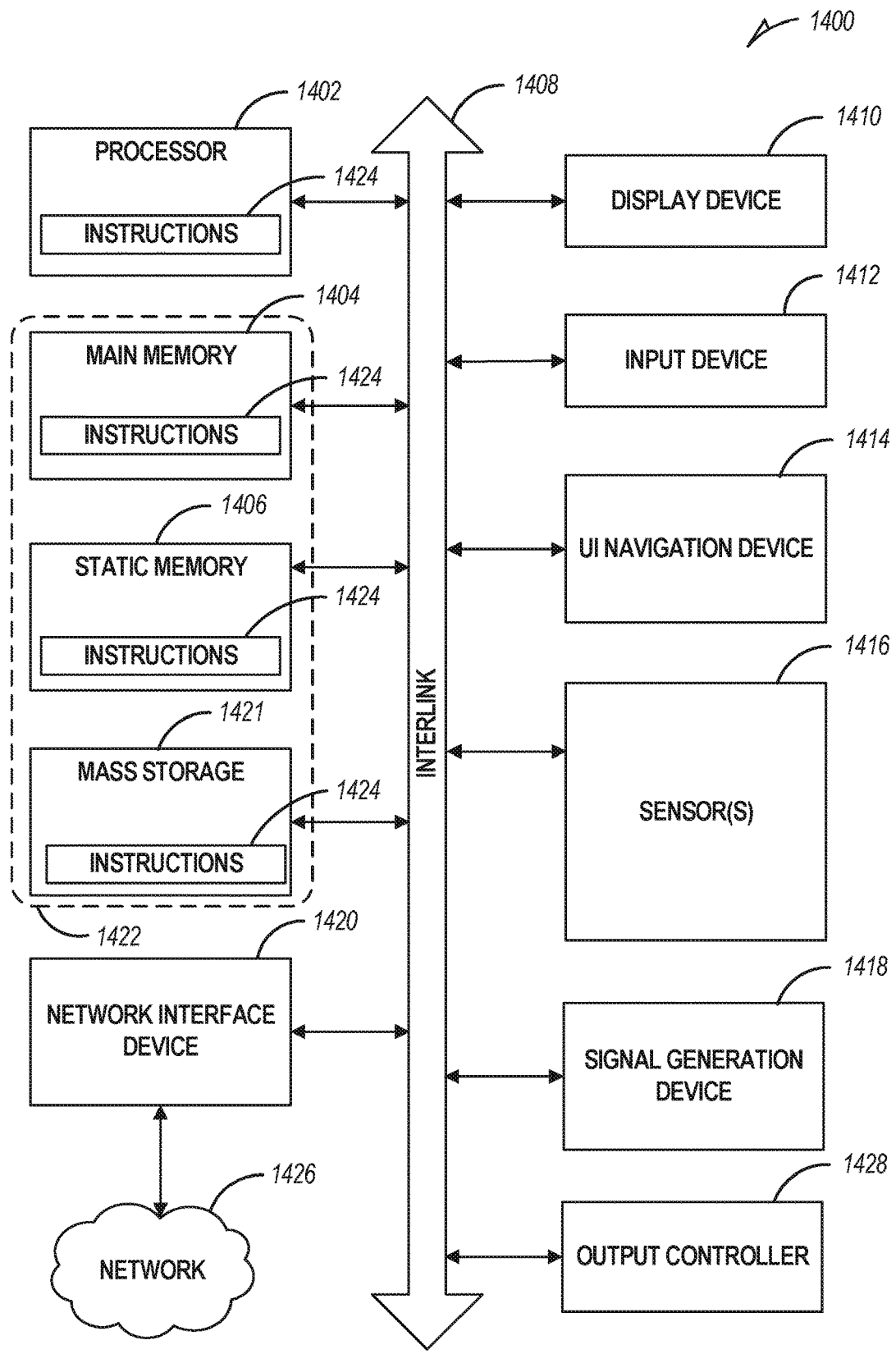
FIG. 14 illustrates a block diagram of an example machine upon which any one or more of the techniques (e.g., methodologies) discussed herein may be performed.

FIG. 14 illustrates a block diagram of an example machine 1400 upon which any one or more of the techniques (e.g., methodologies) discussed herein may be performed. For example, the memory device 100 may include, or be implemented by one or more components of FIG. 14. Host 135 may be or include one or more components of machine 1400. In these examples, the memory device 100 may be the mass storage 1421. One or more components of machine 1400 may implement one or more of the methods or structures of FIGS. 1-13. For example, through operations of instructions 1424.

In alternative embodiments, the machine 1400 can operate as a standalone device or can be connected (e.g., networked) to other machines. In a networked deployment, the machine 1400 can operate in the capacity of a server machine, a client machine, or both in server-client network environments. In an example, the machine 1400 can act as a peer machine in peer-to-peer (P2P) (or other distributed) network environment. The machine 1400 can be a personal computer (PC), a tablet PC, a set-top box (STB), a personal digital assistant (PDA), a mobile telephone, a web appliance, an IoT device, automotive system, a host device, a memory device, or any machine capable of executing instructions (sequential or otherwise) that specify actions to be taken by that machine. Components of machine 1400 can be present in a memory device (e.g., a processor, main memory, mass storage and the like). Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible overtime and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 1400 (e.g., the host device 135, the memory device 100, etc.) can include a hardware processor 1402 (e.g., a central processing unit (CPU), a graphics processing unit (GPU), a hardware processor core, or any combination thereof, such as the processors 115 of memory controller 105, etc.), a main memory 1404 and a static memory 1406, some or all of which can communicate with each other via an interlink (e.g., bus) 1408. The machine 1400 can further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 can be a touch screen display. The machine 1400 can additionally include sensors 1416, a signal generation device 1418 (e.g., a speaker), and a network interface device 1420. Sensors 1416 may include a global positioning system (GPS) sensor, compass, accelerometer, and/or other sensors. The machine 1400 can include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1421 can include a machine readable medium 1422 on which is stored one or more sets of data structures or instructions 1424 (e.g., software) embodying or utilized by any one or more of the techniques or functions described herein. The instructions 1424 can also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the mass storage device 1416 can constitute the machine readable medium 1422.

While the machine readable medium 1422 is illustrated as a single medium, the term "machine readable medium" can include a single medium or multiple media (e.g., a centralized or distributed database, or associated caches and servers) configured to store the one or more instructions 1424.

The term "machine readable medium" can include any medium capable of storing, encoding, or carrying instructions for execution by the machine 1400 and that cause the machine 1400 to perform any one or more of the techniques of the present disclosure, or capable of storing, encoding or carrying data structures used by or associated with such instructions. Non-limiting machine readable medium examples can include solid-state memories, and optical and magnetic media. In some examples, the machine readable medium 1422 is a non-transitory machine-readable medium. In an example, a massed machine-readable medium comprises a machine-readable medium with a plurality of particles having invariant (e.g., rest) mass. Accordingly, massed machine-readable media are not transitory propagating signals. Specific examples of massed machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 (e.g., software, programs, an operating system (OS), etc.) or other data are stored on the mass storage device 1421, can be accessed by the memory 1404 for use by the processor 1402. The memory 1404 (e.g., DRAM) is typically fast, but volatile, and thus a different type of storage than the storage device 1421 (e.g., an SSD), which is suitable for long-term storage, including while in an "off" condition. The instructions 1424 or data in use by a user or the machine 1400 are typically loaded in the memory 1404 for use by the processor 1402. When the memory 1404 is full, virtual space from the storage device 1421 can be allocated to supplement the memory 1404; however, because the storage 1421 device is typically slower than the memory 1404, and write speeds are typically at least twice as slow as read speeds, use of virtual memory can greatly reduce user experience due to storage device latency (in contrast to the memory 1404, e.g., DRAM). Further, use of the storage device 1421 for virtual memory can greatly reduce the usable lifespan of the storage device 1421.

In contrast to virtual memory, virtual memory compression (e.g., the Linux® kernel feature "ZRAM") uses part of the memory as compressed block storage to avoid paging to the storage device 1421. Paging takes place in the compressed block until it is necessary to write such data to the storage device 1421. Virtual memory compression increases the usable size of memory 1404, while reducing wear on the storage device 1421.

Storage devices, such as mass storage 1421 may be memory devices, such as NAND memory devices. Storage devices such as mass storage 1421 may be optimized for mobile electronic devices, or mobile storage, including MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 1424 can further be transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1420 can include one or more physical jacks (e.g., Ethernet, coaxial, or phone jacks) or one or more antennas to connect to the communications network 1426. In an example, the network interface device 1420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium capable of storing, encoding or carrying instructions for execution by the machine 1400, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, i.e., a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

OTHER NOTES AND EXAMPLES

Example 1 is a method for storing data on a non-volatile memory device, the method comprising: receiving data to write to a plurality of memory cells of the memory device; responsive to receiving the data, generating a scrambler seed value for the data; scrambling the data by transforming the data using a scrambling algorithm and the seed value to produce scrambled data; encoding both the seed value and the scrambled data to create encoded data; causing the encoded data to be written to a first plurality of memory cells of a first die the memory device; identifying that the encoded data is to be copied to a second plurality of memory cells within the first die; and responsive to identifying that the encoded data is to be copied to the second plurality of memory cells, causing the encoded data to be copied to the second plurality of memory cells without transferring a host data portion of the encoded data from the first die to a controller of the memory device.

In Example 2, the subject matter of Example 1 includes, wherein generating the seed value comprises obtaining a random number.

In Example 3, the subject matter of Example 2 includes, wherein obtaining the random number comprises using a hardware random number generator.

In Example 4, the subject matter of Examples 2-3 includes, wherein the random number is a pseudo-random number generated from a pseudo-random number generator.

In Example 5, the subject matter of Examples 1-4 includes, wherein the seed value is an encryption key.

In Example 6, the subject matter of Examples 1-5 includes, wherein the scrambling algorithm is an XOR algorithm and wherein scrambling the data comprises XORing the data with a random sequence generated with the seed value to produce the scrambled data.

In Example 7, the subject matter of Examples 1-6 includes, wherein the scrambling algorithm is an encryption algorithm and wherein scrambling the data by transforming the data using the encryption algorithm and the seed value to produce the scrambled data comprises encrypting the data with the seed value.

In Example 8, the subject matter of Examples 1-7 includes, receiving a read request for the data; reading the encoded data from the second plurality of memory cells; decoding the encoded data to produce the scrambled data and the seed value; and unscrambling the scrambled data with the seed value to produce the data.

Example 9 is a memory device comprising: a first memory die including a plurality of memory cells; a controller, configured to perform operations comprising: receiving data to write to the plurality of memory cells; responsive to receiving the data, generating a scrambler seed value for the data; scrambling the data by transforming the data using a scrambling algorithm and the seed value to produce scrambled data; encoding both the seed value and the scrambled data to create encoded data; causing the encoded data to be written to a first plurality of memory cells of the first die; identifying that the encoded data is to be copied to a second plurality of memory cells within the first die; and responsive to identifying that the encoded data is to be copied to the second plurality of memory cells, causing the encoded data to be copied to the second plurality of memory cells without transferring a host data portion of the encoded data from the first die to a controller of the memory device.

In Example 10, the subject matter of Example 9 includes, wherein the operations of generating the seed value comprises obtaining a random number.

In Example 11, the subject matter of Example 10 includes, wherein the memory device comprises a hardware random number generator and wherein the operations of obtaining the random number comprises obtaining the random number from the hardware random number generator.

In Example 12, the subject matter of Examples 10-11 includes, wherein the random number is a pseudo-random number generated from a pseudo-random number generator.

In Example 13, the subject matter of Examples 9-12 includes, wherein the seed value is an encryption key.

In Example 14, the subject matter of Examples 9-13 includes, wherein the scrambling algorithm is an XOR algorithm and wherein the operations of scrambling the data comprises XORing the data with a random sequence generated with the seed value to produce the scrambled data.

In Example 15, the subject matter of Examples 9-14 includes, wherein the scrambling algorithm is an encryption algorithm and wherein the operation of scrambling the data by transforming the data using the encryption algorithm and the seed value to produce the scrambled data comprises encrypting the data with the seed value.

In Example 16, the subject matter of Examples 9-15 includes, wherein the operations further comprise: receiving a read request for the data; reading the encoded data from the second plurality of memory cells; decoding the encoded data to produce the scrambled data and the seed value; and unscrambling the scrambled data with the seed value to produce the data.

Example 17 is a non-transitory machine-readable medium, storing instructions, which when executed, cause a memory device to perform operations comprising: receiving data to write to a plurality of memory cells of the memory device; responsive to receiving the data, generating a scrambler seed value for the data; scrambling the data by transforming the data using a scrambling algorithm and the seed value to produce scrambled data; encoding both the seed value and the scrambled data to create encoded data; causing the encoded data to be written to a first plurality of memory cells of the first die; identifying that the encoded data is to be copied to a second plurality of memory cells within the first die; and responsive to identifying that the encoded data is to be copied to the second plurality of memory cells, causing the encoded data to be copied to the second plurality of memory cells without transferring a host data portion of the encoded data from the first die to a controller of the memory device.

In Example 18, the subject matter of Example 17 includes, wherein the operations of generating the seed value comprises obtaining a random number.

In Example 19, the subject matter of Example 18 includes, wherein the memory device comprises a hardware random number generator and wherein the operations of obtaining the random number comprises obtaining the random number from the hardware random number generator.

In Example 20, the subject matter of Examples 18-19 includes, wherein the random number is a pseudo-random number generated from a pseudo-random number generator.

In Example 21, the subject matter of Examples 17-20 includes, wherein the seed value is an encryption key.

In Example 22, the subject matter of Examples 17-21 includes, wherein the scrambling algorithm is an XOR algorithm and wherein the operations of scrambling the data comprises XORing the data with a random sequence generated with the seed value to produce the scrambled data.

In Example 23, the subject matter of Examples 17-22 includes, wherein the scrambling algorithm is an encryption algorithm and wherein the operation of scrambling the data by transforming the data using the encryption algorithm and the seed value to produce the scrambled data comprises encrypting the data with the seed value.

In Example 24, the subject matter of Examples 17-23 includes, wherein the operations further comprise: receiving a read request for the data; reading the encoded data from the second plurality of memory cells; decoding the encoded data to produce the scrambled data and the seed value; and unscrambling the scrambled data with the seed value to produce the data.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

Example 29 is a method for storing data on a non-volatile memory device, the method comprising: receiving data to write to a plurality of memory cells of the memory device; responsive to receiving the data, generating a scrambler seed value for the data; scrambling the data by transforming the data using a scrambling algorithm and the seed value to produce scrambled data; encoding both the seed value and the scrambled data to create encoded data; causing the encoded data to be written to a first plurality of memory cells of a first die the memory device; identifying that the encoded data is to be copied to a second plurality of memory cells within the first die; and responsive to identifying that the encoded data is to be copied to the second plurality of memory cells, causing the encoded data to be copied to the second plurality of memory cells without transferring a host data portion of the encoded data from the first die to a controller of the memory device.

In Example 30, the subject matter of Example 29 includes, wherein generating the seed value comprises obtaining a random number.

In Example 31, the subject matter of Example 30 includes, wherein obtaining the random number comprises using a hardware random number generator.

In Example 32, the subject matter of Examples 30-31 includes, wherein the random number is a pseudo-random number generated from a pseudo-random number generator.

In Example 33, the subject matter of Examples 29-32 includes, wherein the seed value is an encryption key.

In Example 34, the subject matter of Examples 29-33 includes, wherein the scrambling algorithm is an XOR algorithm and wherein scrambling the data comprises XORing the data with a random sequence generated with the seed value to produce the scrambled data.

In Example 35, the subject matter of Examples 29-34 includes, wherein the scrambling algorithm is an encryption algorithm and wherein scrambling the data by transforming the data using the encryption algorithm and the seed value to produce the scrambled data comprises encrypting the data with the seed value.

In Example 36, the subject matter of Examples 29-35 includes, receiving a read request for the data; reading the encoded data from the second plurality of memory cells; decoding the encoded data to produce the scrambled data and the seed value; and unscrambling the scrambled data with the seed value to produce the data.

Example 37 is a memory device comprising: a first memory die including a plurality of memory cells; a controller, configured to perform operations comprising: receiving data to write to the plurality of memory cells; responsive to receiving the data, generating a scrambler seed value for the data; scrambling the data by transforming the data using a scrambling algorithm and the seed value to produce scrambled data; encoding both the seed value and the scrambled data to create encoded data; causing the encoded data to be written to a first plurality of memory cells of the first die; identifying that the encoded data is to be copied to a second plurality of memory cells within the first die; and responsive to identifying that the encoded data is to be copied to the second plurality of memory cells, causing the encoded data to be copied to the second plurality of memory cells without transferring a host data portion of the encoded data from the first die to a controller of the memory device.

In Example 38, the subject matter of Example 37 includes, wherein the operations of generating the seed value comprises obtaining a random number.

In Example 39, the subject matter of Example 38 includes, wherein the memory device comprises a hardware random number generator and wherein the operations of obtaining the random number comprises obtaining the random number from the hardware random number generator.

In Example 40, the subject matter of Examples 38-39 includes, wherein the random number is a pseudo-random number generated from a pseudo-random number generator.

In Example 41, the subject matter of Examples 37-40 includes, wherein the seed value is an encryption key.

In Example 42, the subject matter of Examples 37-41 includes, wherein the scrambling algorithm is an XOR algorithm and wherein the operations of scrambling the data comprises XORing the data with a random sequence generated with the seed value to produce the scrambled data.

In Example 43, the subject matter of Examples 37-42 includes, wherein the scrambling algorithm is an encryption algorithm and wherein the operation of scrambling the data by transforming the data using the encryption algorithm and the seed value to produce the scrambled data comprises encrypting the data with the seed value.

In Example 44, the subject matter of Examples 37-43 includes, wherein the operations further comprise: receiving a read request for the data; reading the encoded data from the second plurality of memory cells; decoding the encoded data to produce the scrambled data and the seed value; and unscrambling the scrambled data with the seed value to produce the data.

Example 45 is a non-transitory machine-readable medium, storing instructions, which when executed, cause a memory device to perform operations comprising: receiving data to write to a plurality of memory cells of the memory device; responsive to receiving the data, generating a scrambler seed value for the data; scrambling the data by transforming the data using a scrambling algorithm and the seed value to produce scrambled data; encoding both the seed value and the scrambled data to create encoded data; causing the encoded data to be written to a first plurality of memory cells of the first die; identifying that the encoded data is to be copied to a second plurality of memory cells within the first die; and responsive to identifying that the encoded data is to be copied to the second plurality of memory cells, causing the encoded data to be copied to the second plurality of memory cells without transferring a host data portion of the encoded data from the first die to a controller of the memory device.

In Example 46, the subject matter of Example 45 includes, wherein the operations of generating the seed value comprises obtaining a random number.

In Example 47, the subject matter of Example 46 includes, wherein the memory device comprises a hardware random number generator and wherein the operations of obtaining the random number comprises obtaining the random number from the hardware random number generator.

In Example 48, the subject matter of Examples 46-47 includes, wherein the random number is a pseudo-random number generated from a pseudo-random number generator.

In Example 49, the subject matter of Examples 45-48 includes, wherein the seed value is an encryption key.

In Example 50, the subject matter of Examples 45-49 includes, wherein the scrambling algorithm is an XOR algorithm and wherein the operations of scrambling the data comprises XORing the data with a random sequence generated with the seed value to produce the scrambled data.

In Example 51, the subject matter of Examples 45-50 includes, wherein the scrambling algorithm is an encryption algorithm and wherein the operation of scrambling the data by transforming the data using the encryption algorithm and the seed value to produce the scrambled data comprises encrypting the data with the seed value.

In Example 52, the subject matter of Examples 45-51 includes, wherein the operations further comprise: receiving a read request for the data; reading the encoded data from the second plurality of memory cells; decoding the encoded data to produce the scrambled data and the seed value; and unscrambling the scrambled data with the seed value to produce the data.

Example 53 is at least one machine-readable medium including instructions that, when executed by processing circuitry, cause the processing circuitry to perform operations to implement of any of Examples 29-52.

Example 54 is an apparatus comprising means to implement of any of Examples 29-52.

Example 55 is a system to implement of any of Examples 29-52.

Example 56 is a method to implement of any of Examples 29-52.

Example 57 is a method for performing a copyback operation a memory device, the method comprising: at a memory controller of the memory device: receiving encoded meta-data from a memory die over an internal communication interface of the memory device and responsive to initiation of a copyback operation, wherein host-data corresponding to the meta-data is not sent by the memory die over the internal communication interface; decoding the encoded meta-data to produce decoded meta-data; unscrambling the decoded meta-data to produce unscrambled meta-data using a key value, the key value stored as part of the decoded meta-data; updating the unscrambled meta-data to produce updated meta-data; scrambling the updated meta-data with the key value to produce scrambled updated meta-data; encoding the scrambled updated meta-data to produce encoded updated meta-data; and sending the encoded updated meta-data to the memory die, the encoded updated meta-data combined with encoded host-data and written to a new location on the memory die.

In Example 58, the subject matter of Example 57 includes, wherein updating the unscrambled meta-data comprises updating a write temperature.

In Example 59, the subject matter of Examples 57-58 includes, wherein updating the unscrambled meta-data comprises updating a write time.

In Example 60, the subject matter of Examples 57-59 includes, at the memory die of the memory device: identifying an internal copyback command for a first memory location; read the first memory location to obtain the encoded meta-data and the encoded host-data; storing the encoded host-data in a memory buffer on the memory die; sending the encoded meta-data to the memory controller; receiving the encoded updated meta-data from the memory controller; and writing the encoded updated meta-data along with the encoded host-data stored in the memory buffer to the new location on the memory die.

In Example 61, the subject matter of Examples 57-60 includes, wherein unscrambling the decoded meta-data to produce unscrambled meta-data using the key value comprises applying an XOR operation to the decoded meta-data and the key value.

In Example 62, the subject matter of Examples 57-61 includes, wherein the encoded meta-data includes encoding information used in the decoding.

In Example 63, the subject matter of Example 62 includes, wherein the encoding information is at least one parity bit.

In Example 64, the subject matter of Examples 62-63 includes, wherein the encoding information of the encoded meta-data differs from second encoding information included in encoded host-data corresponding to the host-data.

Example 65 is a memory device comprising: a memory controller configured to perform the operations comprising: receiving encoded meta-data from a memory die over an internal communication interface of the memory device and responsive to initiation of a copyback operation, wherein host-data corresponding to the meta-data is not sent by the memory die over the internal communication interface; decoding the encoded meta-data to produce decoded meta-data; unscrambling the decoded meta-data to produce unscrambled meta-data using a key value, the key value stored as part of the decoded meta-data; updating the unscrambled meta-data to produce updated meta-data; scrambling the updated meta-data with the key value to produce scrambled updated meta-data; encoding the scrambled updated meta-data to produce encoded updated meta-data; and sending the encoded updated meta-data to the memory die, the encoded updated meta-data combined with encoded host-data and written to a new location on the memory die.

In Example 66, the subject matter of Example 65 includes, wherein the operations of updating the unscrambled meta-data comprises updating a write temperature.

In Example 67, the subject matter of Examples 65-66 includes, wherein the operations of updating the unscrambled meta-data comprises updating a write time.

In Example 68, the subject matter of Examples 65-67 includes, the memory die, the memory die comprising a processor configured to perform operations comprising: identifying an internal copyback command for a first memory location; read the first memory location to obtain the encoded meta-data and the encoded host-data; storing the encoded host-data in a memory buffer on the memory die; sending the encoded meta-data to the memory controller; receiving the encoded updated meta-data from the memory controller; and writing the encoded updated meta-data along with the encoded host-data stored in the memory buffer to the new location on the memory die.

In Example 69, the subject matter of Examples 65-68 includes, wherein the operations of unscrambling the decoded meta-data to produce unscrambled meta-data using the key value comprises applying an XOR operation to the decoded meta-data and the key value.

In Example 70, the subject matter of Examples 65-69 includes, wherein the encoded meta-data includes encoding information used in the decoding.

In Example 71, the subject matter of Example 70 includes, wherein the encoding information is at least one parity bit.

In Example 72, the subject matter of Examples 70-71 includes, wherein the encoding information of the encoded meta-data differs from second encoding information included in encoded host-data corresponding to the host-data.

Example 73 is a non-transitory machine-readable medium, storing instructions, which when executed by a memory device, cause the memory device to perform operations comprising: receiving encoded meta-data from a memory die over an internal communication interface of the memory device and responsive to initiation of a copyback operation, wherein host-data corresponding to the meta-data is not sent by the memory die over the internal communication interface; decoding the encoded meta-data to produce decoded meta-data; unscrambling the decoded meta-data to produce unscrambled meta-data using a key value, the key value stored as part of the decoded meta-data; updating the unscrambled meta-data to produce updated meta-data; scrambling the updated meta-data with the key value to produce scrambled updated meta-data; encoding the scrambled updated meta-data to produce encoded updated meta-data; and sending the encoded updated meta-data to the memory die, the encoded updated meta-data combined with encoded host-data and written to a new location on the memory die.

In Example 74, the subject matter of Example 73 includes, wherein the operations of updating the unscrambled meta-data comprises updating a write temperature.

In Example 75, the subject matter of Examples 73-74 includes, wherein the operations of updating the unscrambled meta-data comprises updating a write time.

In Example 76, the subject matter of Examples 73-75 includes, wherein the operations further comprise: at the memory die: identifying an internal copyback command for a first memory location; read the first memory location to obtain the encoded meta-data and the encoded host-data; storing the encoded host-data in a memory buffer on the memory die; sending the encoded meta-data to the memory controller; receiving the encoded updated meta-data from the memory controller; and writing the encoded updated meta-data along with the encoded host-data stored in the memory buffer to the new location on the memory die.

Example 77 is at least one machine-readable medium including instructions that, when executed by processing circuitry, cause the processing circuitry to perform operations to implement of any of Examples 57-76.

Example 78 is an apparatus comprising means to implement of any of Examples 57-76.

Example 79 is a system to implement of any of Examples 57-76.

Example 80 is a method to implement of any of Examples 57-76.

The invention claimed is:

1. A method for performing a copyback operation in a memory device, the method comprising:
at a memory controller of the memory device:
receiving encoded meta-data from a memory die over an internal communication interface of the memory device and responsive to initiation of a copyback operation, wherein host-data corresponding to the meta-data is not sent by the memory die over the internal communication interface;
decoding the encoded meta-data to produce decoded meta-data;
unscrambling the decoded meta-data to produce unscrambled meta-data using a key value, the key value stored as part of the decoded meta-data;
updating the unscrambled meta-data to produce updated meta-data;
scrambling the updated meta-data with the key value to produce scrambled updated meta-data;
encoding the scrambled updated meta-data to produce encoded updated meta-data; and
sending the encoded updated meta-data to the memory die, the encoded updated meta-data combined with encoded host-data and written to a new location on the memory die.

2. The method of claim 1, wherein updating the unscrambled meta-data comprises updating a write temperature.

3. The method of claim 1, wherein updating the unscrambled meta-data comprises updating a write time.

4. The method of claim 1, further comprising:
at the memory die of the memory device:
identifying an internal copyback command for a first memory location;
read the first memory location to obtain the encoded meta-data and the encoded host-data;
storing the encoded host-data in a memory buffer on the memory die;
sending the encoded meta-data to the memory controller;
receiving the encoded updated meta-data from the memory controller; and
writing the encoded updated meta-data along with the encoded host-data stored in the memory buffer to the new location on the memory die.

5. The method of claim 1, wherein unscrambling the decoded meta-data to produce unscrambled meta-data using the key value comprises applying an XOR operation to the decoded meta-data and the key value.

6. The method of claim 1, wherein the encoded meta-data includes encoding information used in the decoding.

7. The method of claim 6, wherein the encoding information is at least one parity bit.

8. The method of claim 6, wherein the encoding information of the encoded meta-data differs from second encoding information included in encoded host-data corresponding to the host-data.

9. A memory device comprising:
a memory controller configured to perform the operations comprising:
receiving encoded meta-data from a memory die over an internal communication interface of the memory device and responsive to initiation of a copyback operation, wherein host-data corresponding to the meta-data is not sent by the memory die over the internal communication interface;
decoding the encoded meta-data to produce decoded meta-data;
unscrambling the decoded meta-data to produce unscrambled meta-data using a key value, the key value stored as part of the decoded meta-data;
updating the unscrambled meta-data to produce updated meta-data;
scrambling the updated meta-data with the key value to produce scrambled updated meta-data;
encoding the scrambled updated meta-data to produce encoded updated meta-data; and
sending the encoded updated meta-data to the memory die, the encoded updated meta-data combined with encoded host-data and written to a new location on the memory die.

10. The memory device of claim 9, wherein the operations of updating the unscrambled meta-data comprises updating a write temperature.

11. The memory device of claim 9, wherein the operations of updating the unscrambled meta-data comprises updating a write time.

12. The memory device of claim 9, further comprising:
the memory die, the memory die comprising a processor configured to perform operations comprising:
identifying an internal copyback command for a first memory location;
read the first memory location to obtain the encoded meta-data and the encoded host-data;
storing the encoded host-data in a memory buffer on the memory die;
sending the encoded meta-data to the memory controller;
receiving the encoded updated meta-data from the memory controller; and
writing the encoded updated meta-data along with the encoded host-data stored in the memory buffer to the new location on the memory die.

13. The memory device of claim 9, wherein the operations of unscrambling the decoded meta-data to produce unscrambled meta-data using the key value comprises applying an XOR operation to the decoded meta-data and the key value.

14. The memory device of claim 9, wherein the encoded meta-data includes encoding information used in the decoding.

15. The memory device of claim 14, wherein the encoding information is at least one parity bit.

16. The memory device of claim 14, wherein the encoding information of the encoded meta-data differs from second encoding information included in encoded host-data corresponding to the host-data.

17. A non-transitory machine-readable medium, storing instructions, which when executed by a memory device, cause the memory device to perform operations comprising:
receiving encoded meta-data from a memory die over an internal communication interface of the memory device and responsive to initiation of a copyback operation, wherein host-data corresponding to the meta-data is not sent by the memory die over the internal communication interface;
decoding the encoded meta-data to produce decoded meta-data;
unscrambling the decoded meta-data to produce unscrambled meta-data using a key value, the key value stored as part of the decoded meta-data;
updating the unscrambled meta-data to produce updated meta-data;
scrambling the updated meta-data with the key value to produce scrambled updated meta-data;
encoding the scrambled updated meta-data to produce encoded updated meta-data; and
sending the encoded updated meta-data to the memory die, the encoded updated meta-data combined with encoded host-data and written to a new location on the memory die.

18. The non-transitory machine-readable medium of claim 17, wherein the operations of updating the unscrambled meta-data comprises updating a write temperature.

19. The non-transitory machine-readable medium of claim 17, wherein the operations of updating the unscrambled meta-data comprises updating a write time.

20. The non-transitory machine-readable medium of claim 17, wherein the operations further comprise:
at the memory die:
identifying an internal copyback command for a first memory location;
read the first memory location to obtain the encoded meta-data and the encoded host-data;
storing the encoded host-data in a memory buffer on the memory die;
sending the encoded meta-data to the memory controller;
receiving the encoded updated meta-data from the memory controller; and
writing the encoded updated meta-data along with the encoded host-data stored in the memory buffer to the new location on the memory die.

* * * * *